US008850511B2

(12) United States Patent
Shiomi

(10) Patent No.: US 8,850,511 B2
(45) **Date of Patent: *Sep. 30, 2014**

(54) PROGRAM REPLACING METHOD

(71) Applicant: Panasonic Corporation, Kadoma (JP)

(72) Inventor: Takakazu Shiomi, Osaka (JP)

(73) Assignee: Panasonic Corporation, Osaka (JP)

( * ) Notice: Subject to any disclaimer, the term of this patent is extended or adjusted under 35 U.S.C. 154(b) by 5 days.

This patent is subject to a terminal disclaimer.

(21) Appl. No.: 13/870,229

(22) Filed: Apr. 25, 2013

(65) Prior Publication Data

US 2013/0239138 A1 Sep. 12, 2013

Related U.S. Application Data

(63) Continuation of application No. 13/307,519, filed on Nov. 30, 2011, now Pat. No. 8,453,195, which is a continuation of application No. 10/857,883, filed on Jun. 2, 2004, now Pat. No. 8,104,068.

(60) Provisional application No. 60/475,497, filed on Jun. 4, 2003.

(30) Foreign Application Priority Data

Jun. 4, 2003 (JP) ................................ 2003-158928

(51) Int. Cl.

| | |
|---|---|
| ***H04N 7/16*** | (2011.01) |
| ***H04N 7/173*** | (2011.01) |
| ***G06F 9/445*** | (2006.01) |
| ***G06F 9/54*** | (2006.01) |
| ***H04N 21/235*** | (2011.01) |
| ***H04N 21/458*** | (2011.01) |
| ***H04N 21/435*** | (2011.01) |
| ***H04N 21/81*** | (2011.01) |

(52) U.S. Cl.

CPC .......... *H04N 21/458* (2013.01); *G06F 9/44521* (2013.01); *G06F 9/542* (2013.01); *G06F 9/44552* (2013.01); *G06F 8/67* (2013.01); *G06F 8/65* (2013.01); *H04N 21/235* (2013.01); *H04N 21/435* (2013.01); *H04N 21/8173* (2013.01)

USPC ............................ 725/152; 725/132; 725/140

(58) Field of Classification Search

None

See application file for complete search history.

(56) References Cited

U.S. PATENT DOCUMENTS 5,715,462 A 2/1998 Iwamoto et al.
5,768,539 A 6/1998 Metz et al.

(Continued)

FOREIGN PATENT DOCUMENTS

JP 10-083309 3/1998
JP 10-326192 12/1998

(Continued)

OTHER PUBLICATIONS

Rath et al., "Set-top box control software: a key component in digital video," Philips Journal of Research, Elsevier, Amsterdam, NL, vol. 50, No. 1, Jan. 1, 1996, pp. 185-199, XP004008210.

(Continued)

*Primary Examiner* — Brian T Pendleton
*Assistant Examiner* — Dika C. Okeke
(74) *Attorney, Agent, or Firm* — Greenblum & Bernstein, P.L.C.

(57) ABSTRACT

A program replacing method includes registering a first program so that message transmission is enabled between the first program and a detachable point of deployment (POD). The first program has an identifier that identifies a program type of the first program. When a second program having the same identifier as the first program exists in the broadcast receiving terminal apparatus, the second program is notified that message transmission between the second program and the point of deployment is to be terminated. Approval for terminating the message transmission between the second program and the point of deployment is received from the second program. The message transmission between the second program and the point of deployment is then terminated.

2 Claims, 34 Drawing Sheets

(56) References Cited

U.S. PATENT DOCUMENTS

| | | | | |
|---|---|---|---|---|
| 5,797,010 | A | 8/1998 | Brown | |
| 5,960,445 | A | 9/1999 | Tamori et al. | |
| 5,974,855 | A * | 11/1999 | Seberger | 73/1.59 |
| 5,978,855 | A | 11/1999 | Metz et al. | |
| 6,230,319 | B1 | 5/2001 | Britt, Jr. et al. | |
| 6,263,497 | B1 | 7/2001 | Maeda et al. | |
| 6,594,747 | B2 | 7/2003 | Takayasu | |
| 6,601,112 | B1 * | 7/2003 | O'Rourke et al. | 719/312 |
| 6,628,891 | B1 * | 9/2003 | Vantalon et al. | 386/255 |
| 6,665,869 | B1 | 12/2003 | Ellis et al. | |
| 6,704,933 | B1 | 3/2004 | Tanaka et al. | |
| 6,904,611 | B1 | 6/2005 | Poli et al. | |
| 7,231,411 | B1 | 6/2007 | Lu | |
| 2002/0157115 | A1 * | 10/2002 | Lu | 725/131 |
| 2003/0009752 | A1 * | 1/2003 | Gupta | 717/171 |
| 2003/0061604 | A1 | 3/2003 | Elcock et al. | |
| 2003/0084440 | A1 | 5/2003 | Lownes | |
| 2004/0068721 | A1 * | 4/2004 | O'Neill et al. | 717/168 |
| 2004/0226049 | A1 | 11/2004 | Shiomi | |
| 2005/0015814 | A1 * | 1/2005 | Yun | 725/132 |
| 2005/0144651 | A1 * | 6/2005 | Prus et al. | 725/134 |

FOREIGN PATENT DOCUMENTS

| | | |
|---|---|---|
| JP | 11-102287 | 4/1999 |
| JP | 2002-312186 | 10/2002 |
| JP | 2002-366381 | 12/2002 |
| JP | 2003-122578 | 4/2003 |
| JP | 4149414 | 9/2008 |
| KR | 2003-0013459 | 2/2003 |
| WO | 01/58146 | 8/2001 |
| WO | 02/087224 | 10/2002 |

OTHER PUBLICATIONS

"Open Cable Common Download Specification ", Cable Television Laboratories, retrieved from the internet on Nov. 26, 2002: <URL: http://web.archive.org/web/20030605212529/www.opencable.com/downloads/specs/OC-SP-CDS-IF-104-021126.pdf>.

INDIA (573/CHE/2008) Office action, mail date is Feb. 19, 2014.

INDIA (574/CHE/2008) Office action, mail date is Feb. 19, 2014.

INDIA (575/CHE/2008) Office action, mail date is Feb. 19, 2014.

* cited by examiner

FIG.3

| Frequency band | Usage | Modulation technique |
|---|---|---|
| 5~130MHz | Out Of Band (OOB) Data exchange between head end and terminals | QPSK |
| 130~864MHz | In-band Ordinary television broadcasting including video and audio | QAM |

FIG.4

| Frequency band | Usage |
|---|---|
| 70~74MHz | Data transmission from head end 101 to terminal apparatuses |
| 10.0~10.1MHz | Data transmission from terminal apparatus A111 to head end 101 |
| 10.1~10.2MHz | Data transmission from terminal apparatus B112 to head end 101 |
| 10.2~10.3MHz | Data transmission from terminal apparatus C113 to head end 101 |

FIG.5

| Frequency band | Usage |
|---|---|
| 150~156MHz | Television channel 1 |
| 156~162MHz | Television channel 2 |
| ⋮ | ⋮ |
| 310~311MHz | Radio channel 1 |
| ⋮ | ⋮ |

| | 1601 | 1602 |
|---|---|---|
| 1611 | 101 | 501 |
| 1612 | 102 | 502 |
| 1613 | 103 | 503 |

FIG.18

| | 1701 | 1702 | 1703 |
|---|---|---|---|
| 1711 | Audio | 5011 | |
| 1712 | Video | 5012 | |
| 1713 | Data | 5013 | AIT |
| 1714 | Data | 5014 | DSMCC[1] |

| | Java program identifier 1801 | Control information 1802 | DSMCC identifier 1803 | Program name 1804 |
|---|---|---|---|---|
| 1811 | 301 | autostart | 1 | /a/TopXlet |
| 1812 | 302 | present | 1 | /b/GameXlet |

FIG.21

| | Java program identifier 2001 | Control information 2002 | DSMCC identifier 2003 | Program name 2004 | Priority 2005 |
|---|---|---|---|---|---|
| 2011 | 701 | autoselect | 1 | /a/PPV1Xlet | 200 |
| 2012 | 702 | present | 1 | /b/PPVXlet2 | 201 |

FIG.23
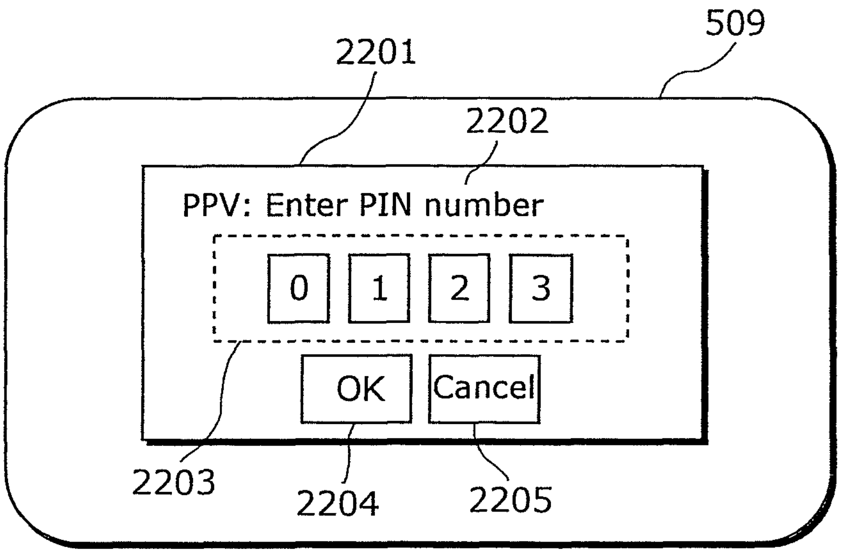
FIG.24
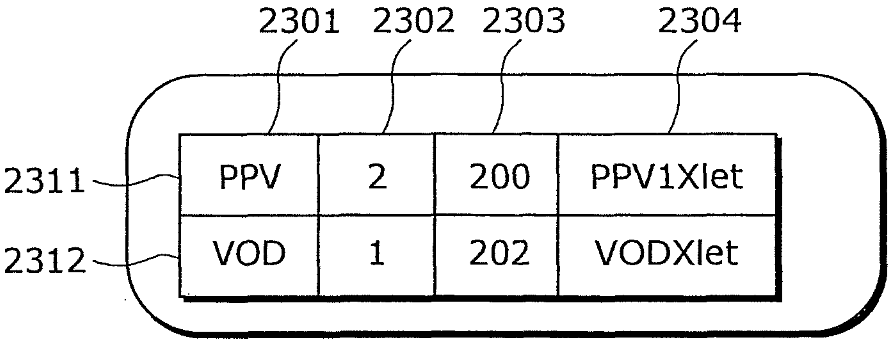
FIG.25
| Operation type number | Description |
|---|---|
| 1 | Cannot coexist with another program |
| 2 | Can coexist with another program |

PROGRAM REPLACING METHOD

CROSS REFERENCE RELATED TO APPLICATION

This is a continuation of U.S. Application No. U.S. application Ser. No. 13/307,519, filed on Nov. 30, 2011, which is a continuation application of U.S. application Ser. No. 10/857,883 filed on Jun. 2, 2004 (now U.S. Pat. No. 8,104,068, issued on Jan. 24, 2012), which claims the benefit of U.S. Provisional Application No. 60/475,497, filed on Jun. 4, 2003, and also claims priority of Japanese Application No. 2003-158928, the disclosures of which are expressly incorporated herein by reference in their entirety.

BACKGROUND OF THE INVENTION (1) Field of the Invention

The present invention relates to an update method of downloading a program and replacing an existing program with the downloaded program, and more particularly to executing a downloaded program in a digital television by temporarily replacing an existing program with such downloaded program.

(2) Description of the Related Art

Conventional techniques for downloading and updating programs in a digital television are disclosed in Japanese Laid-Open Patent application No. 10-326192 and Japanese Laid-Open Patent application No. 2003-122587. FIG. 1 is a diagram showing the structure of an existing digital cable television system for downloading and executing programs. This system is comprised of a head end 4110 and two terminal apparatuses 4120 and 4130. The head end 4110 stores three programs of a program A4111, a program B4112, and a program C4113, and supplies these programs to the terminal apparatuses 4120 and 4130. The terminal apparatus 4120 is equipped with a processor 4124 for executing three programs which it pre-stores, a program A4131, a program B4132, and a program C4133. Upon the receipt of a new program from the head end 4110, the terminal apparatuses 4120 and 4130 replace the existing programs with such new program, store updated program, and execute it from then on. For example, when the head end 4110 sends the new program A4111 to the terminal apparatuses 4120 and 4130, the terminal apparatuses 4120 and 4130 replace the programs A4121 and 4131 with such program A4111. From then on, the processors 4124 and 4134 execute the updated program A4111 instead of the programs A4121 and 4131. As described above, by updating programs which terminal apparatuses hold, it becomes possible to update their functions as well as to add new functions to such terminal apparatuses.

However, since existing programs are updated according to the existing techniques, it is not easy to restore the programs to the state before they were updated. Thus, when wishing to provide a terminal apparatus with a certain function only for a limited period or length of time, it becomes necessary to download the programs from the head end again so as to restore them. In general, program downloading consumes much time and prevents the user from using another function of the terminal apparatus. Thus, there arises the problem that the user cannot use the terminal apparatus when such user is required to download programs more frequently.

SUMMARY OF THE INVENTION

It is an object of the present invention to provide a program replacing method that makes it possible to update a program in a broadcast receiving terminal apparatus, as well as to easily restore an existing program to the state before it is updated.

In order to achieve the above object, the present invention is a program replacing method for replacing a program in a broadcast receiving terminal apparatus, the program being registered so that message transmission is enabled between said program and a detachable POD equipped to the broadcast receiving terminal apparatus, the method comprising steps of: registering a first program so that message transmission is enabled between the first program and the POD, the first program having an identifier for identifying a program type; notifying a second program that message transmission between the second program and the POD is to be terminated, the second program having an identifier that is the same as the identifier of the first program and existing already in the broadcast receiving terminal apparatus; and terminating message transmission between the second program and the POD. Accordingly, even when the first program, which is a new program for update, is downloaded, it is possible to easily restore the second program, which is an existing program, to the state before it is updated, since such second program remains stored without being deleted. Note that "POD" is a card called CableCard™ for performing descramble and the like.

Here, the above program replacing method may further comprise a step of notifying the first program that message transmission between said first program and the POD has been enabled. Accordingly, it becomes possible for the first program to know that message transmission to and from the POD has been enabled, and therefore to start carrying out message transmission to and from the POD.

Note that message transmission between the second program and the POD is terminated by unregistering the second program that has been registered so that message transmission between said second program and the POD is enabled. Moreover, the first program may be carried in a broadcast wave.

Furthermore, the second program that has been notified that message transmission between said second program and the POD is to be terminated may perform processing necessary for unregistering the second program that has been registered so that message transmission between said second program and the POD is enabled. Accordingly, it becomes possible for the second program to perform post-processing that is required to be carried out after update.

Moreover, the above program replacing method may further comprise the steps of terminating message transmission between the first program and the POD; and registering the second program so that message transmission between said second program and the POD is enabled again, wherein the message transmission between the second program and the POD has been terminated. Accordingly, when the second program is required to be restored to the state before it is updated again after being replaced with the first program, it becomes possible to restore such second program just by performing registration processing, without needing to download the second program again.

Note that the above program replacing method may further comprise a step of notifying the first program that message transmission between said first program and the POD is to be terminated before the step of terminating message transmission between the first program and the POD. Accordingly, since it is notified to the first program that the first program will be terminated before it is actually terminated, it becomes possible for the first program to complete necessary processing before the termination.

Also, in order to achieve the above object, the present invention is a program replacing method for replacing a program in a broadcast receiving terminal apparatus, the program being registered so that message transmission is enabled between said program and a detachable POD equipped to the broadcast receiving terminal apparatus, the method comprising steps of: notifying a first program that message transmission between said first program and the POD is to be terminated, the first program being registered so that message transmission is enabled between said first program and the POD and having an identifier for identifying a program type; terminating message transmission between the first program and the POD, the first program being registered so that message transmission is enabled between said first program and the POD and having the identifier for identifying the program type; and registering a second program so that message transmission is enabled between said second program and the POD, the second program having an identifier that is the same as the identifier of the first program and existing already in the broadcast receiving terminal apparatus. Accordingly, it becomes possible to restore the first program to the state before it is updated, by replacing the updated first program with the pre-updated second program.

Note that not only is it possible to embody the present invention as a program replacing method with the above configuration, but also as: a program replacing apparatus in which each of the steps in the above program replacing method is implemented as a circuit and the like; a program that causes a computer to execute each of the steps in the above program replacing method; and a computer-readable recording medium in which said program is stored.

The disclosure of U.S. Provisional Application No. 60/475,497 filed on Jun. 4, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 shows an example of using frequency bands to be used for communications between a head end and terminal apparatuses in the cable television system according to the present invention;

FIG. 4 shows an example of using frequency bands to be used for communications between the head end and the terminal apparatuses in the cable television system according to the present invention;

FIG. 5 shows an example of using frequency bands to be used for communications between the head end and the terminal apparatuses in the cable television system according to the present invention;

FIG. 14(2) shows an example of a display screen displayed by the display 509 according to the present invention;

FIG. 17 is a schematic diagram showing the contents of a PAT specified in the MPEG2 standard according to the present invention;

FIG. 18 is a schematic diagram showing the contents of a PMT specified in the MPEG2 standard according to the present invention;

FIG. 21 is a schematic diagram showing the contents of XAIT according to the present invention;

FIG. 23 shows an example of a display screen displayed by the display 509 according to the present invention;

FIG. 24 shows an example of information stored in the secondary storage unit 510 according to the present invention;

FIG. 25 is a table showing operation type codes of Java programs and meanings thereof according to the present invention;

FIG. 31(2) is a schematic diagram showing message delivery from the POD 504 in the first embodiment;

FIG. 31(3) is a schematic diagram showing message delivery from the POD 504 in the first embodiment;

FIG. 32(2) is a schematic diagram showing message delivery from the POD 504 in the first embodiment;

FIG. 33(2) is a schematic diagram showing message delivery from the POD 504 in the first embodiment;

FIG. 33(3) is a schematic diagram showing message delivery from the POD 504 in the first embodiment

DESCRIPTION OF THE PREFERRED EMBODIMENTS

The following describes in detail the preferred embodiments of the present invention with reference to the drawings.

(First Embodiment)

Figure 1:
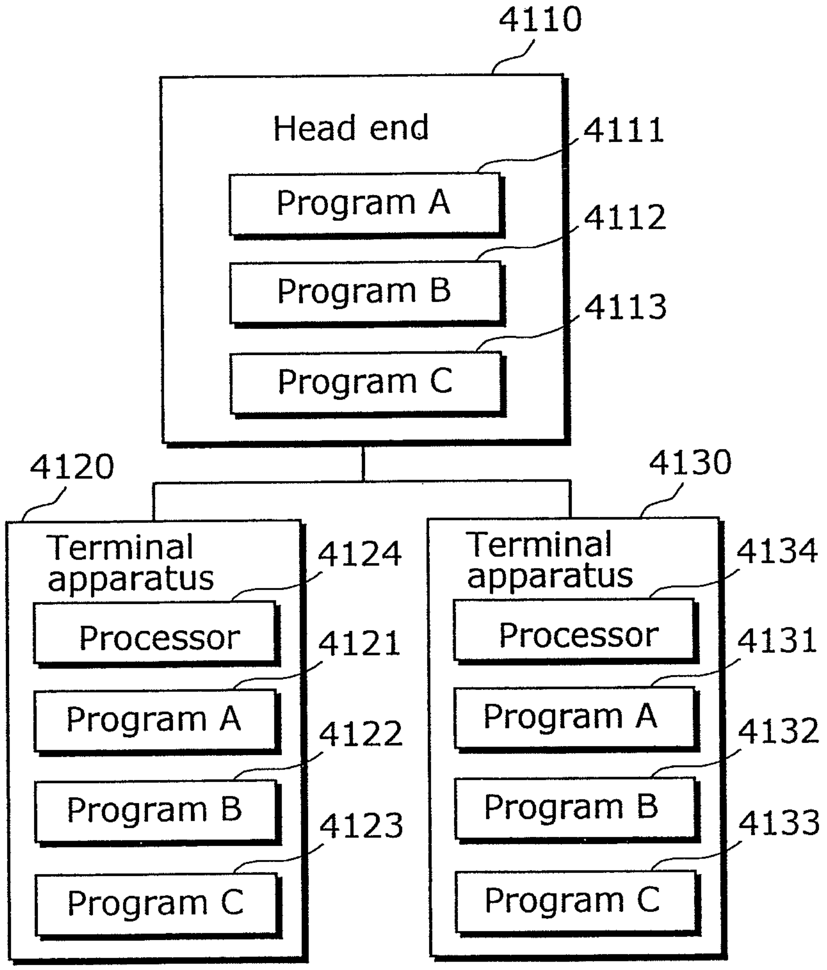
FIG. 1 is a diagram showing a structure of the existing program replacing apparatus.
Figure 2:
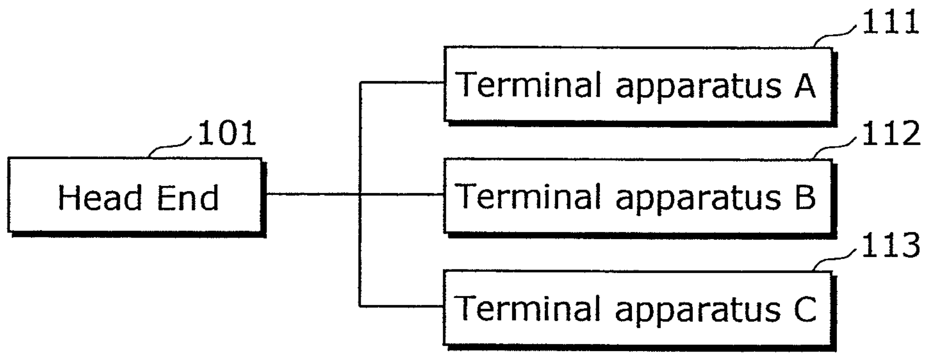
FIG. 2 is a diagram showing a structure of a cable television system according to a first embodiment of the present invention.

An explanation is given of the first embodiment of a cable television system according to the present invention with reference to the figures. FIG. 2 is a block diagram showing the relationship among apparatuses composing the cable system, which are a head end 101, and three terminal apparatuses: a terminal apparatus A111, a terminal apparatus B112, and a terminal apparatus C113. In the present embodiment, three terminal apparatuses are connected to one head end, but it is possible to carry out the present invention if an arbitrary number of terminal apparatuses is/are connected to the head end.

The head end 101 transmits, to plural terminal apparatuses, broadcast signals such as video, audio and data, and receives data transmitted from the terminal apparatuses. In order to realize this, frequency bands are divided for use of data transmission between the head end 101, and the terminal apparatus A111, the terminal apparatus B112, and the terminal apparatus C113. FIG. 3 is a table showing an example of divided frequency bands. There are roughly two types of frequency bands: Out of Band (to be abbreviated as OOB) and In-Band. A frequency band of 5~130 MHz is allocated to OOB to be mainly used for data exchange between the head end 101, and the terminal apparatus A111, the terminal apparatus 8112, and the terminal apparatus C113. A frequency band of 130 MHz~864 MHz is allocated to In-Band to be mainly used for broadcast channels including video and audio. QPSK is employed for OOB, whereas QAM64 is employed for In-Band as modulation techniques. A detailed explanation of modulation techniques is omitted here, since they are publicly known techniques which are less related to the present invention. FIG. 4 shows a more specific example of how the OOB frequency band is used. A frequency band of 70 MHz~74 MHz is used to transmit data from the head end 101. In this case, all of the terminal apparatus A111, the terminal apparatus B112, and the terminal apparatus C113 receive the same data from the head end 101. Meanwhile, a frequency band of 10.0 MHz~10.1 MHz is used to transmit data from the terminal apparatus A111 to the head end 101. A frequency band of 10.1 MHz~10.2 MHz is used to transmit data from the terminal apparatus B112 to the head end 101. A frequency band of 10.2 MHz~10.3 MHz is used to transmit data from the terminal apparatus C113 to the head end 101. Accordingly, it becomes possible to transmit data unique to each terminal apparatus to the head end 101 from the terminal apparatus A111, the terminal apparatus B112, and the terminal apparatus C113. FIG. 5 shows an example use of the In-Band frequency band. Frequency bands of 150~156 MHz and 156~162 MHz are allocated respectively to a television channel 1 and a television channel 2, and the subsequent frequencies are allocated to television channels at 6 MHz intervals. 310 MHz and the subsequent frequencies are allocated to radio channels at 1 MHz intervals. Each of the above channels may be used either for analog broadcasting or digital broadcasting. In the case of digital broadcasting, data is transmitted in the MPEG2 transport packet format compliant with the MPEG2 specification, in which case data intended for various data broadcasting systems can be transmitted, in addition to audio and video data.

The head end 101 is equipped with a QPSK modulation unit, a QAM modulation unit, and the like in order to transmit suitable broadcast signals to the respective frequency ranges. Moreover, the head end 101 is equipped with a QPSK demodulation unit for receiving data from the terminal apparatuses. Also, the head end 101 is assumed to be further equipped with various devices related to the above modulation units and demodulation unit. However, a detailed explanation of them is omitted here, since the present invention is mainly related to the terminal apparatuses.

The terminal apparatus A111, the terminal apparatus B112, and the terminal apparatus C113 receive and reproduce broadcast signals transmitted from the head end 101. Furthermore, the terminal apparatus A111, the terminal apparatus B112, and the terminal apparatus C113 transmit data unique to each terminal apparatus to the head end 101. In the present embodiment, these three terminal apparatuses shall have the same configuration.

Figure 6:
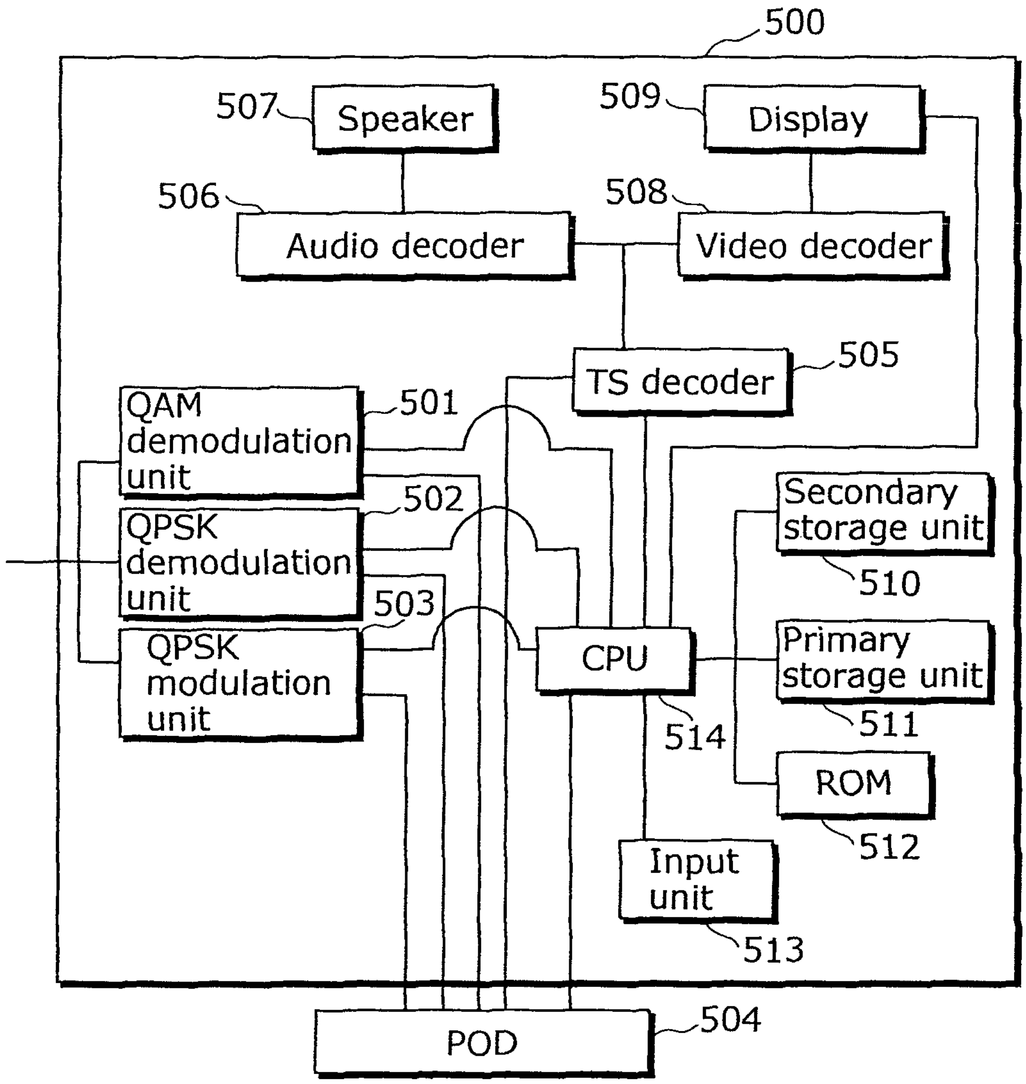
FIG. 6 is a diagram showing a configuration of a terminal apparatus in the cable television system according to the present invention.

FIG. 6 is a block diagram showing a hardware configuration of each terminal apparatus. 500 is a terminal apparatus, which is made up of a QAM demodulation unit 501, a QPSK demodulation unit 502, a QPSK modulation unit 503, a TS decoder 505, an audio decoder 506, a speaker 507, a video decoder 508, a display 509, a secondary storage unit 510, a primary storage unit 511, a ROM 512, an input unit 513, and a CPU 514. Furthermore, a POD 504 can be attached to/detached from the terminal apparatus 500.

Figure 7:
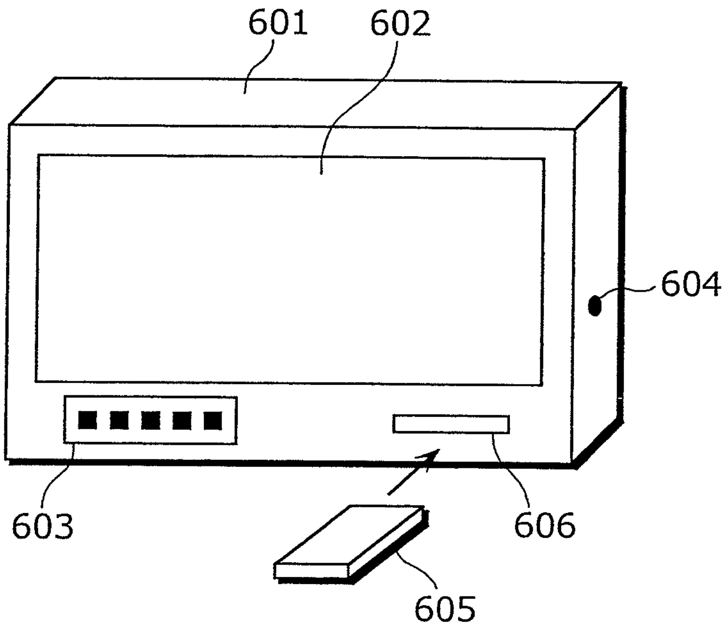
FIG. 7 shows an example external view of the terminal apparatus in the cable television system according to the present invention.

FIG. 7 shows a thin-shaped television, which is an example external view of the terminal apparatus 500.

601 is a steel case of the thin-shaped television, in which all components of the terminal apparatus 500 except for the POD 504 are contained.

602 is a display, which corresponds to the display 509 in FIG. 6.

603 is a front panel unit which is made up of plural buttons and which corresponds to the input unit 513 in FIG. 6.

604 is a signal input terminal to which a cable line is connected for transmitting/receiving signals to and from the head end 101. The signal input terminal is connected to the QAM demodulation unit 501, the QPSK demodulation unit 502, and the QPSK modulation unit 503 shown in FIG. 6.

605 is a POD card corresponding to the POD 504 in FIG. 6. The POD 504 is embodied independently of the terminal apparatus's 500 and can be attached to/detached from the terminal apparatus 500, as in the case of the POD card 605 in FIG. 7. A detailed explanation of the POD 504 is given later.

606 is an insertion slot into which the POD card 605 is inserted.

Referring to FIG. 6, the QAM demodulation unit 501 demodulates a signal which has been QAM-modulated in and transmitted from the head end 101, according to tuning information that includes a frequency specified by the CPU 514, and passes the resultant to the POD 504.

The QPSK demodulation unit 502 demodulates a signal which has been QPSK-modulated in and transmitted from the head end 101, according to tuning information that includes a frequency specified by the CPU 514, and passes the resultant to the POD 504.

The QPSK modulation unit 503 QPSK-demodulates a signal passed from the POD 504, according to demodulation information that includes a frequency specified by the CPU 514, and transmits the resultant to the head end 101.

As shown in FIG. 7, the POD 504 is detachable from the main body of the terminal apparatus 500. An example of the POD 504 is a card called CableCard™ for performing descramble and the like. The definition of the connection interface between the main body of the terminal 500 and the POD 504 is given in OpenCable™ HOST-POD Interface Specification (OC-SP-HOSTPOD-IF-I12-030210) and in specifications referred to by such specification. Therefore, a detailed description is omitted here, and an explanation is given only of constituent elements relevant to the present invention.

Figure 8:
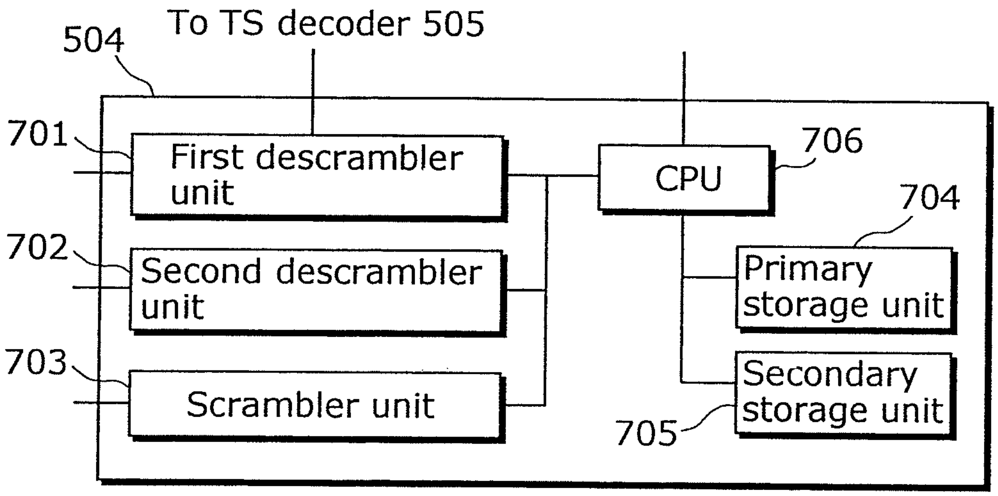
FIG. 8 is a diagram showing a hardware configuration of a POD 504 according to the present invention.

FIG. 8 is a block diagram showing an internal configuration of the POD 504. The POD 504 is made up of a first descrambler unit 701, a second descrambler unit 702, a scrambler unit 703, a primary storage unit 704, a secondary storage unit 705, and a CPU 706.

The first descrambler unit 701 receives a scrambled signal from the QAM demodulation unit 501 of the terminal apparatus 500 under the instruction from the CPU 706, and descrambles such signal. Then, the first descrambler unit 701 transmits the descrambled signal to the TS decoder 505 of the terminal apparatus 500. Information required for descrambler such as a key is provided by the CPU 706 according to need. More specifically, the head end 101 broadcasts several pay channels, and when the user purchased the right to view these pay channels, the first descrambler unit 701 receives required information such as a key from the CPU 706 and performs descrambler. Accordingly, the user can view these pay channels. When required information such as a key is not provided, the first descrambler unit 701 passes the received signal directly to the TS decoder 505 without performing descrambling.

The second descrambler unit 702 receives a scrambled signal from the QPSK demodulation unit 502 of the terminal apparatus 500 under the instruction from the CPU 706, and descrambles such signal. Then, the second descrambler unit 702 passes the descrambled data to the CPU 706.

The scrambler unit 703 scrambles the data received from the CPU 706, under the instruction from the CPU 706, and sends the resultant to the QPSK modulation unit 503 of the terminal apparatus 500.

The primary storage unit 704, a concrete constituent element of which is a primary memory such as a RAM, is intended for storing data temporarily when the CPU 706 performs processing.

The secondary storage unit 705, a concrete constituent element of which is a secondary storage memory such as a flash ROM, is intended for storing a program to be executed by the CPU 706 as well as for storing data which should never be deleted even when the power is turned off.

Figure 9:
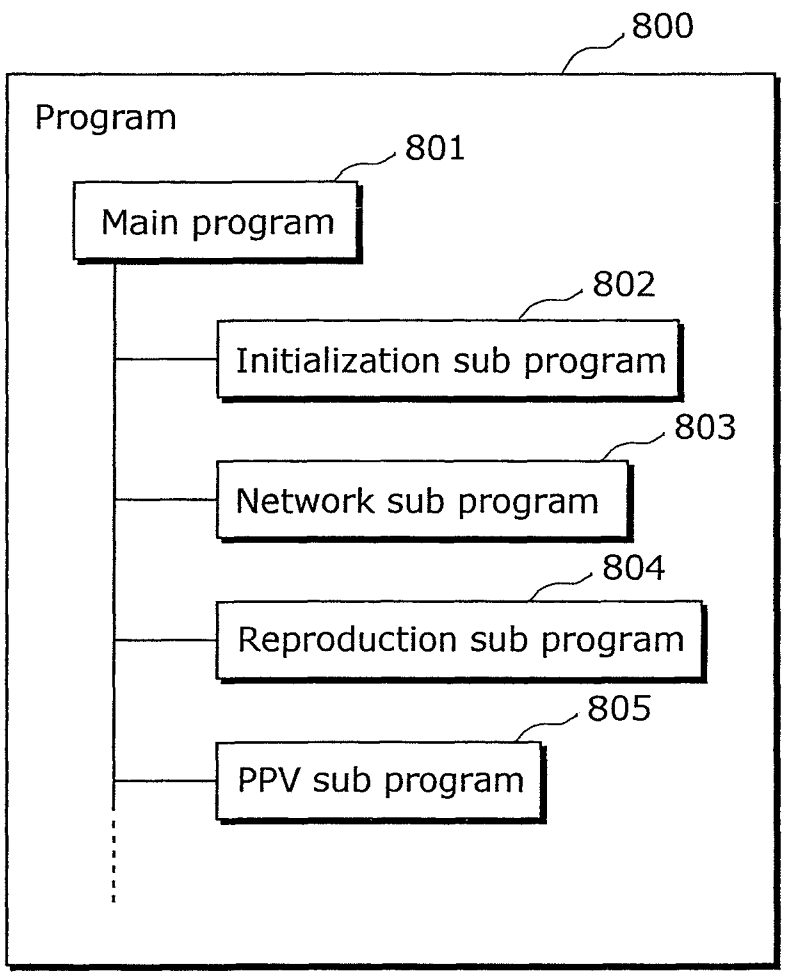
FIG. 9 is a diagram showing a structure of a program stored in the POD 504 according to the present invention.

The CPU 706 executes the program stored in the secondary storage unit 705. The program is made up of plural sub programs. FIG. 9 shows an example of the program stored in the secondary storage unit 705. In FIG. 9, a program 800 is made up of plural sub programs including a main program 801, an initialization sub program 802, a network sub program 803, a reproduction sub program 804, and a PPV sub program 805.

Here, PPV, which is an abbreviation of Pay Per View, refers to a service that allows the user to view a certain program such as a movie on a chargeable basis. When the user enters his/her personal identification number, the fact that the user purchased the right to view the program is notified to the head end 101, and the program is scrambled. Accordingly, the user can view such program. This viewing of the program requires the user to pay for the purchase at later date.

The main program 801, which is the sub program activated by the CPU 706 first of all when the power is turned on, controls the other sub programs.

The initialization sub program 802, which gets activated by the main program 801 when the power is turned on, carries out information exchange and the like with the terminal apparatus 500 to perform initialization processing. This initialization processing is defined in detail in OpenCable™ HOST-POD Interface Specification (OC-SP-HOSTPOD-IF-I12-030210) and in specifications referred to by such specification. Furthermore, the initialization sub program 802 also performs initialization processing not defined in these specifications. Here, a part of such initialization processing is introduced. When the power is turned on, the initialization sub program 802 notifies the QPSK demodulation unit 502 of a first frequency stored in the secondary storage unit 705 via the CPU 514 of the terminal apparatus 500. The QPSK demodulation unit 502 performs tuning using the provided first frequency, and transmits the resulting signal to the secondary scrambler unit 702. Moreover, the initialization sub program 802 provides the secondary descrambler unit 702 with descrambling information such as a first key stored in the secondary storage unit 705. As a result, the secondary descrambler unit 702 performs descrambling and passes the resultant to the CPU 706 executing the initialization sub program 802. Accordingly, the initialization sub program 802 can receive the information. In the present embodiment, the initialization sub program 802 receives information via the network sub program 803. A detailed description on this is given later.

Furthermore, the initialization sub program 802 notifies the QPSK modulation unit 503 of a second frequency stored in the secondary storage unit 705 via the CPU 514 of the terminal apparatus 500. The initialization sub program 802 provides the scrambler unit 703 with scrambling information stored in the secondary storage unit 705. When the initialization sub program 802 provides, via the network sub program 803, the scrambler unit 703 with information required to be sent, the scrambler unit 703 scrambles the data using the provided scrambling information, and provides the scrambled data to the QPSK modulation unit 503. The QPSK modulation unit 503 modulates the scrambled information which it received, and sends the modulated information to the head end 101.

As a result, it becomes possible for the initialization sub program 802 to carry out a bilateral communication with the head end 101 via the terminal apparatus 500, the secondary descrambler unit 702, the scrambler unit 703, and the network sub program 803.

The network sub program 803, which is used by plural sub programs such as the main program 801 and the initialization sub program 802, is a sub program intended for carrying out a bilateral communication with the head end 101. More specifically, the network sub program 803 behaves as if other sub programs using the network sub program 803 were carrying out a bilateral communication with the head end 101 in accordance with TCP/IP. A detailed explanation of TCP/IP is omitted here, since it is a publicly known technique that specifies the protocols to be used when exchanging information between plural terminals. When activated by the initialization sub program 802 at power-on time, the network sub program 803 notifies, via the terminal apparatus 500, the head end 101 of an MAC address (an abbreviation of Media Access Control) which is an identifier for identifying the POD 504 and which is stored in the secondary storage unit 705 beforehand, so as to request for obtaining an IP address. The head end 101 notifies the POD 504 of the IP address via the terminal apparatus 500, and the network sub program 803 stores such IP address in the primary storage unit 704. From then on, the head end 101 and the POD 504 communicate with each other using such IP address as the identifier of the POD 504.

The reproduction sub program 804 provides the first descrambler unit 701 with descrambling information such as a second key stored in the secondary storage unit 705 as well as descrambling information such as a third key provided by the terminal apparatus 500, so as to allow descrambling to be performed. Furthermore, the reproduction sub program 804 receives, via the network sub program 803, information indicating that the signal inputted in the first descrambler unit 701 is a PPV channel. On the notification that the signal is a PPV channel, the reproduction sub program 804 activates the PPV sub program 805.

When activated, the PPV sub program 805 displays, on the terminal apparatus 500, a message that urges the user to purchase the program, and accepts an input from the user. More specifically, when information wished to be displayed on the screen is sent to the CPU 514 of the terminal apparatus 500, a program running on the CPU 514 of the terminal apparatus 500 shows the message on the display 509 of the terminal apparatus 500. Then, when the user enters the personal identification number via the input unit 513 of the terminal apparatus 500, the CPU 514 of the terminal apparatus 500 accepts it, and sends it to the PPV sub program 805 running on the CPU 706 of the POD 504. The PPV sub program 805 sends, to the head end 101, the accepted personal identification number via the network sub program 803. When such personal identification number is valid, the head end 101 notifies, via the network sub program 803, the PPV sub program 805 of descrambling information required for descrambling such as a fourth key. The PPV sub program 805 provides the first descrambler unit 701 with the accepted descrambling information such as the fourth key, and then the first descrambler unit 701 descrambles the input signal.

Figure 10:
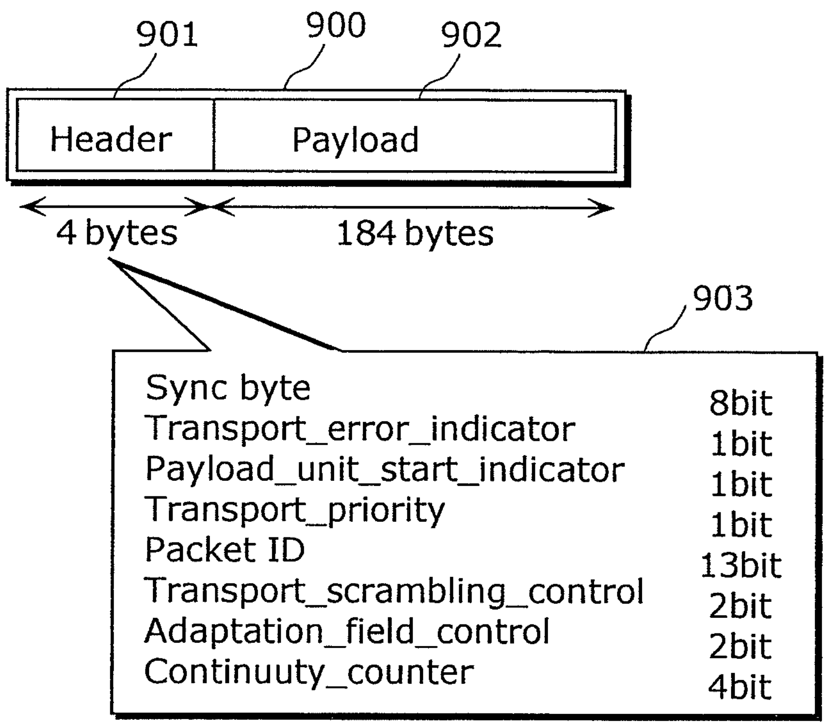
FIG. 10 is a diagram showing a structure of a packet defined in the MPEG standard.
Figure 11:
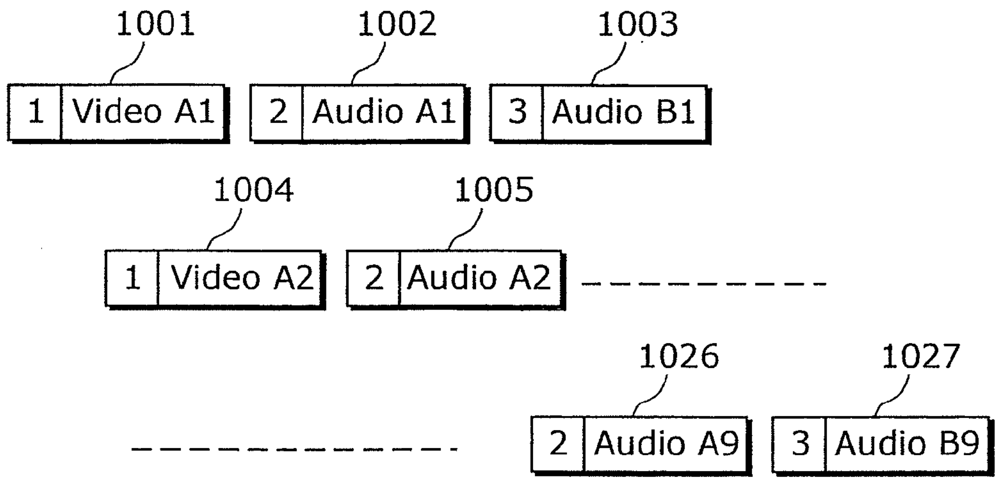
FIG. 11 shows an example of an MPEG2 transport stream.

Referring to FIG. 6, the TS decoder 505 performs filtering on the signal accepted from the POD 504, and passes necessary data to the audio decoder 506, the video decoder 508, and the CPU 514. Here, the signal sent from the POD 504 is an MPEG2 transport stream. A detailed description about an MPEG2 transport stream is given in the MPEG specification ISO/IEC13818-1, and therefore it is not explained in detail in the present embodiment. An MPEG2 transport stream is composed of plural fixed length packets, and a packet ID is assigned to each packet. FIG. 10 is a diagram showing the structure of a packet. 900 is a packet, which contains fixed length 188 bytes. The top four bytes is a header 901 storing information for identifying the packet, and the other 184 bytes is a payload 902 storing information wished to be carried. 903 shows the breakdown of the header 901. A packet ID is included in 13 bits from the 1st to the 12th~24th bit. FIG. 11 is a schematic diagram illustrating plural packet strings to be transmitted. A packet 1001 contains a packet ID "1" in its header and includes the first information of video A in its payload. A packet 1002 contains a packet ID "2" in its header and includes the first information of audio A in its payload. A packet 1003 contains a packet ID "3" in its header and includes the first information of audio B in its payload.

A packet 1004 contains the packet ID "1" in its header and includes the second information of the video A in its payload, which is the subsequent information of the packet 1001. Similarly, packets 1005, 1026, and 1027 carry subsequent data of the other packets. By concatenating the contents of the payloads of packets with the same packet IDs in the above manner, it is possible to reproduce video and audio in successive order.

Refer to FIG. 11. When the CPU 514 indicates, to the TS decoder 505, the packet ID "1" as well as "the video decoder 508" as an output destination, the TS decoder 505 extracts packets with the packet ID "1" from the MPEG2 transport stream received from the POD 504, and passes them to the video decoder 508. In FIG. 11, therefore, only the video data is passed over to the video decoder 508. At the same time, when the CPU 514 indicates, to the TS decoder 505, the packet ID "2" as well as "the audio decoder 506", the TS decoder 505 extracts packets with the packet ID "2" from the MPEG2 transport stream received from the POD 504, and passes them to the audio decoder 506. In FIG. 11, only the audio data is passed over to the video decoder 508.

This processing of extracting only necessary packets according to packet IDs corresponds to filtering to be performed by the TS decoder 505. The TS decoder 505 is capable of performing more than one filtering processing simultaneously at the instruction from the CPU 514.

Referring to FIG. 6, the audio decoder 506 concatenates audio data embedded in the packets in the MPEG2 transport stream provided by the TS decoder 505, performs digital-to-analog conversion on the concatenated data, and outputs the resultant to the speaker 507.

The speaker 507 outputs the signal provided by the audio decoder 506 as audio.

The video decoder 508 concatenates video data embedded in the packets in the MPEG2 transport stream provided by the TS decoder 505, performs digital-to-analog conversion on the concatenated data, and outputs the resultant to the display 509.

The display 509, a concrete constituent element of which is a CRT or a liquid crystal and the like, outputs a video signal provided by the video decoder 508 and displays a message specified by the CPU 514, and so forth.

The secondary storage unit 510, concrete constituent elements of which are a flash memory, a hard disk, and the like, stores and deletes data and programs specified by the CPU 514. Stored data and programs are referred to by the CPU 514. The stored data and programs are kept in storage even while the terminal apparatus 500 is powered off.

The primary storage unit 511, concrete constituent elements of which are a RAM and the like, temporarily stores data and programs specified by the CPU 514 and deletes them. Stored data and programs are referred to by the CPU 514. The stored data and programs are deleted when the terminal apparatus 500 gets powered off.

The ROM 512 is a read-only memory device, concrete constituent elements of which are a ROM, a CD-ROM, and a DVD, and the like. The ROM 512 stores a program to be executed by the CPU 514.

Figure 12:
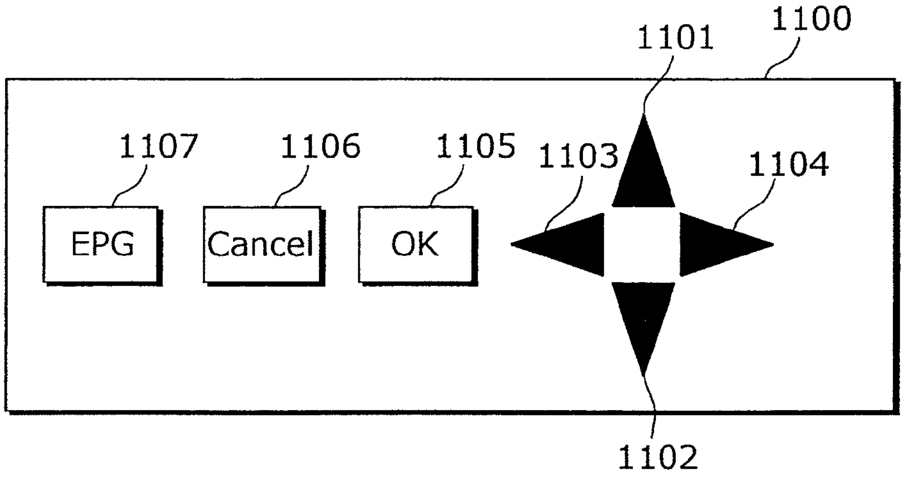
FIG. 12 shows an example external view of an input unit 513 in the case where it is configured in the form of a front panel.

The input unit 513, concrete constituent elements of which are a front panel or a remote controller, accepts an input from the user. FIG. 12 shows an example of the input unit 513 in the case where it is configured in the form of a front panel. 1100 is a front panel, which corresponds to the front panel unit 603 shown in FIG. 7. Such front panel 1100 is made up of seven buttons: an up-cursor button 1101, a down-cursor button 1102, a left-cursor button 1103, a right-cursor button 1104, an OK button 1105, a cancel button 1106, and an EPG button 1107. When the user presses down a button, the identifier of such pressed button is notified to the CPU 514.

The CPU 514 executes the program stored in the ROM 512. According to instructions from such program to be executed, the CPU 514 controls the QAM demodulation unit 501, the QPSK demodulation unit 502, the QPSK modulation unit 503, the POD 504, the TS decoder 505, the display 509, the secondary storage unit 510, the primary storage unit 511, and the ROM 512.

Figure 13:
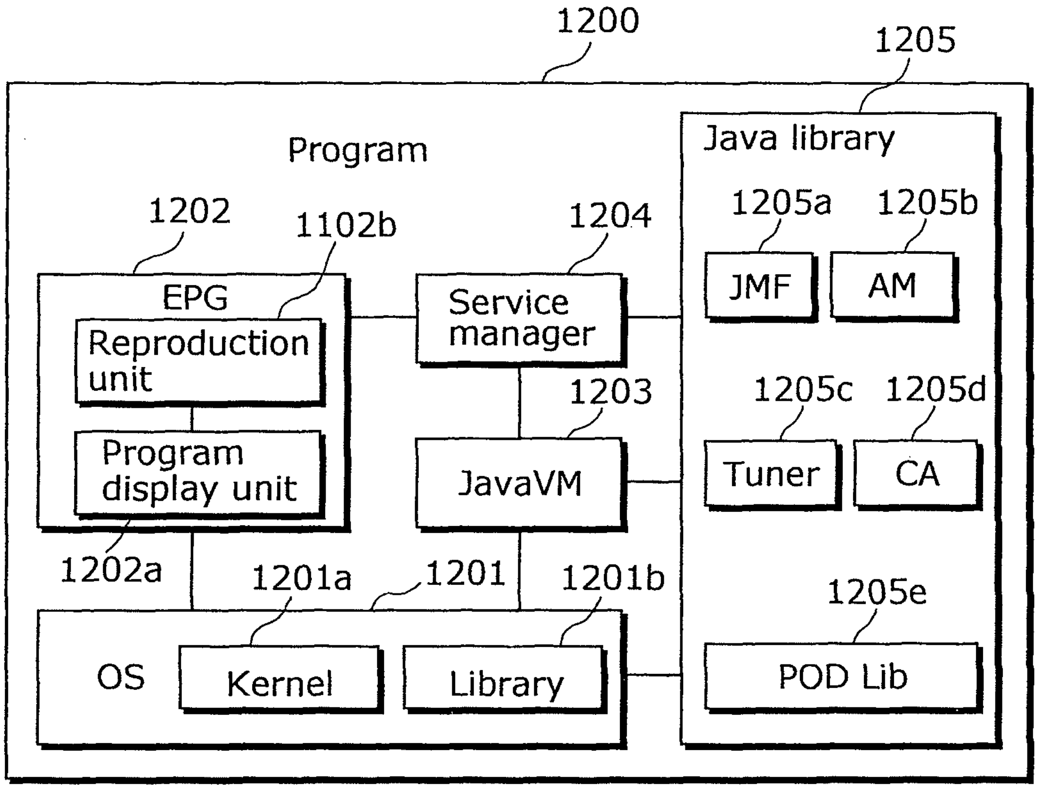
FIG. 13 is a diagram showing a structure of the program stored in a terminal apparatus 500 according to the present invention.

FIG. 13 is a diagram showing an example structure of the program that is stored in the ROM 512 and executed by the CPU 514.

A program 1200 is made up of plural sub programs. To be more specific, the program 1200 is made up of an OS 1201, an EPG 1202, a JavaVM 1203, a service manager 1204, and a Java library 1205.

The OS 1201 is a sub program to be activated by the CPU 514 when the terminal apparatus 500 is powered on. The OS 1201 is an abbreviation of operating system, an example of which is Linux and the like. The OS 1201 is a generic name for a publicly known art made up of a kernel 1201*a* for executing a sub program in parallel with another sub program and of a library 1201*b*, and therefore a detailed explanation is omitted. In the present embodiment, the kernel 1201*a* of the OS 1201 executes the EPG 1202 and the JavaVM 1203 as sub programs. Meanwhile, the library 1201*b* provides these sub programs with plural functions required for controlling the constituent elements of the terminal apparatus 500.

Here, tuning is introduced as an example of such functions. With the function of tuning, tuning information including a frequency is received from another sub program and then passed over to the QAM demodulation unit 501. Accordingly, it is possible for the QAM demodulation unit 501 to perform demodulation based on the provided tuning information, and pass the demodulated data to the POD 504. As a result, the other sub programs can control the QAM demodulation unit via the library 1201*b*.

Figure 14:
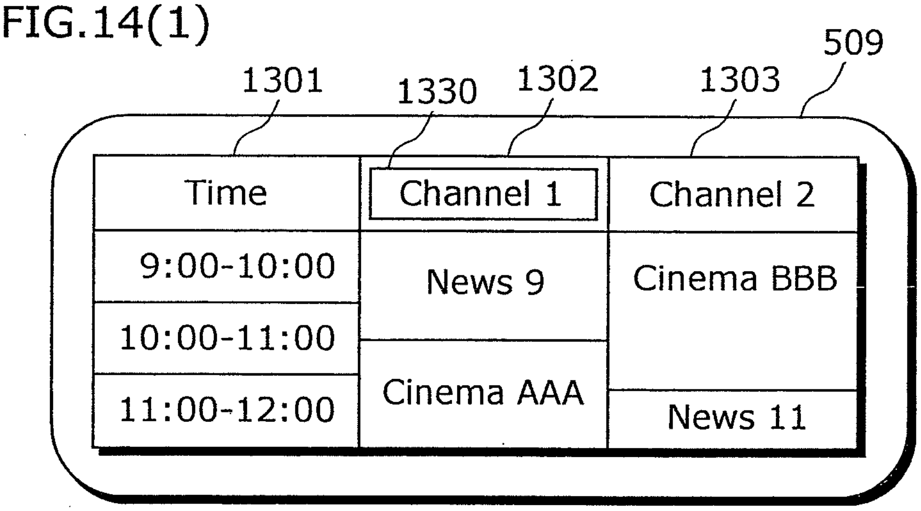
FIG. 14(1) shows an example of a display screen displayed by a display 509 according to the present invention.
Figure 14:
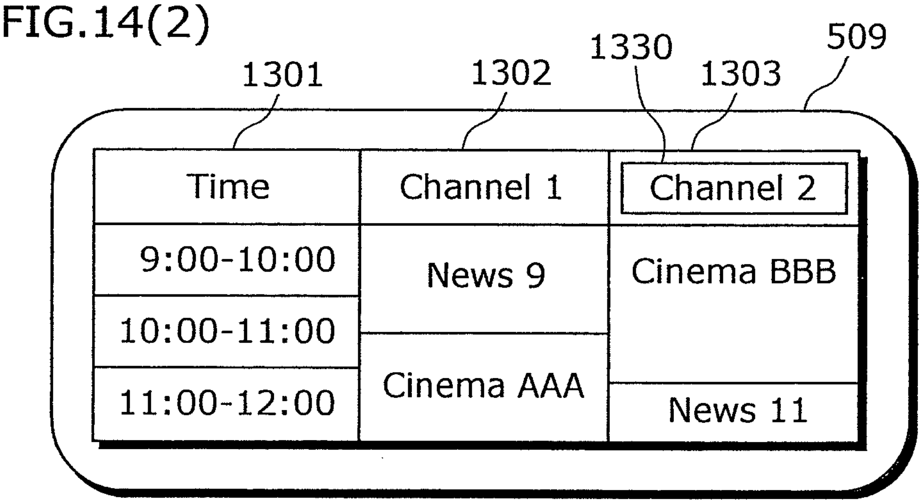

The EPG 1202 is made up of a program display unit 1202*a* for displaying a list of programs to the user as well as for accepting an input from the user, and a reproduction unit 1102*b* for selecting channels. Here, EPG is an abbreviation of Electric Program Guide. The EPG 1202 gets activated when the terminal apparatus 500 is powered on. In the activated EPG 1202, the program display unit 1202*a* waits for an input from the user via the input unit 513 of the terminal apparatus 500. Here, in the case where the input unit 513 takes a form of the front panel illustrated in FIG. 12, when the user presses down the EPG button 1107 on the input unit 513, the CPU 514 is notified of the identifier of such EPG button. The program display unit 1202*a* of the EPG 1202, which is a sub program running on the CPU 514, accepts this identifier, and shows program information on the display 509. FIG. 14(1) and FIG. 13(2) show examples of a program table displayed on the display 509. See FIG. 14(1). The Program information is displayed on the display 509 in a grid pattern. A column 1301 describes time information. A column 1302 describes a channel name “Channel 1” and programs to be broadcast during time periods corresponding to the respective times described in the column 1301. It is shown that a program “News 9” is broadcast from 9:00 to 10:30, and “Cinema AAA” is broadcast from 10:30 to 12:00 on “Channel 1”. A column 1303 describes a channel name “Channel 2” and programs to be broadcast during time periods corresponding to the respective times described in the column 1301, as in the case of the column 1302. A program “Cinema BBB” is broadcast from 9:00 to 11:00, and “News 11” is broadcast from 11:00 to 12:00. 1330 is a cursor. The cursor 1330 moves at the press of the left-cursor 1103 or the right-cursor 1104 on the front panel 1100. When the right-cursor 1104 is pressed down in the state illustrated in FIG. 14(1), the cursor 1330 moves toward right as shown in FIG. 14(2). Meanwhile, when the left-cursor 1103 is pressed down in the state illustrated in FIG. 14(2), the cursor 1330 moves toward left as shown in FIG. 14(1).

When the OK button 1105 on the front panel 1100 is pressed down in the state shown in FIG. 14(1), the program display unit 1202*a* notifies the reproduction unit 1102*b* of the identifier of “Channel 1”. Meanwhile, when the OK button 1105 on the front panel 1100 is pressed down in the state shown in FIG. 14(2), the program display unit 1202*a* notifies the reproduction unit 1102*b* of the identifier of “Channel 2”.

Furthermore, the program display unit 1202*a* periodically stores program information to be displayed from the head end 101 into the primary storage unit 511 via the POD 504. Generally, it takes time to obtain program information from the head end. However, it becomes possible to quickly display a program table by displaying the program information that is pre-stored in the primary storage unit 511 at the press of the EPG button 1107 of the input unit 513.

Figure 15:
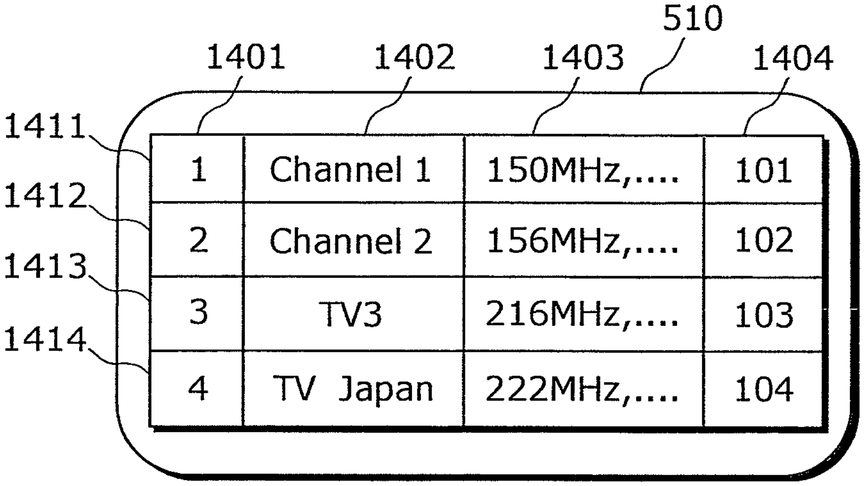
FIG. 15 shows an example of information stored in a secondary storage unit 510 according to the present invention.

The reproduction unit 1102*b* reproduces the channel using the received identifier of the channel. The relationship between channel identifiers and channels is pre-stored by the secondary storage unit 510 as channel information. FIG. 15 shows an example of the channel information stored in the secondary storage unit 510. The channel information is stored in tabular form. A column 1401 describes the identifiers of channels. A column 1402 describes channel names. A column 1403 describes tuning information. Here, the tuning information is represented by values to be provided to the QAM demodulation unit 501 such as frequency, transmission rate, and coding ratio. A column 1404 describes program numbers. Program numbers are numbers used to identify PMTs defined by the MPEG2 standard. A description about PMT is given later. Each of lines 1411~1414 indicates a set of the identifier, channel name, and tuning information of each channel. The line 1411 describes a set that includes “1” as an identifier, “Channel 1” as a channel name, a frequency of “312 MHz” as tuning information, and “101” as a program number. The reproduction unit 1102b passes the identifier of the received channel directly to the service manager in order to reproduce the channel.

Figure 16:
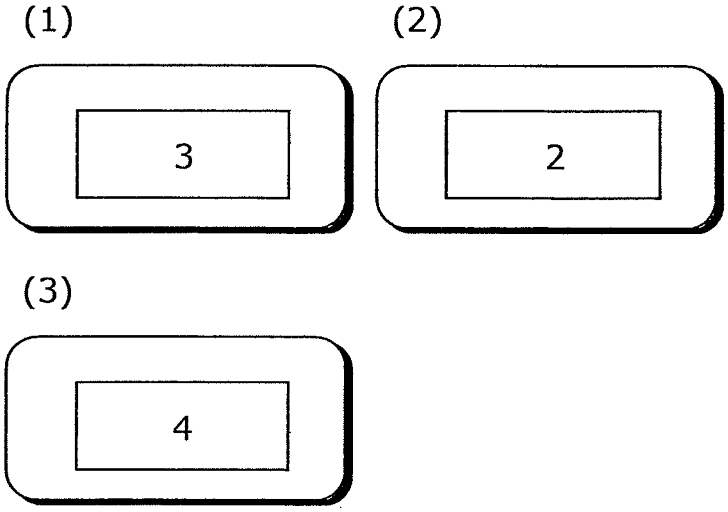
FIG. 16 shows an example of information stored in a primary storage unit 511 according to the present invention.

Moreover, when the user presses down the up-cursor 1101 and the down-cursor 1102 on the front panel 1100 while the reproduction is taking place, the reproduction unit 1102b receives a notification about such press by the user from the input unit 513 via the CPU 514, and switches the channel being reproduced to another one. First, the reproduction unit 1102b stores, in the primary storage unit 511, the identifier of the channel that is currently reproduced. (1), (2), and (3) in FIG. 16 show example identifiers of channels stored in the primary storage unit 511. (1) in FIG. 16 shows that an identifier "3" is stored, and it is shown by referring to FIG. 15 that a channel with the channel name "TV 3" is being reproduced. When the user presses down the up-cursor 1101 in a state illustrated in (1) in FIG. 16, the reproduction unit 1102b refers to the channel information shown in FIG. 15, and passes the identifier "2" of a channel with the channel name of "Channel 2" to the service manager in order to newly reproduce a channel with the channel name of "Channel 2", which is the previous channel in the table. At the same time, the reproduction unit 1102b rewrites the identifier into the channel identifier "2" stored in the primary storage unit 511. (2) in FIG. 16 shows such rewritten channel identifier. Meanwhile, when the user presses down the down-cursor 1102 in the state illustrated in (1) in FIG. 16, the reproduction unit 1102b refers to the channel information shown in FIG. 15, and passes the identifier "4" of a channel with the channel name of "TV Japan" to the service manager in order to newly reproduce a channel with the channel name of "TV Japan", which is the next channel in the table. At the same time, the reproduction unit 1102b rewrites the identifier into the channel identifier "4" stored in the primary storage unit 511. (3) in FIG. 16 shows such rewritten channel identifier.

The JavaVM 1203 is a Java virtual machine that sequentially analyzes and executes programs written in the Java™ language. Programs written in the Java language are compiled into intermediate codes known as byte codes which do not depend on hardware. The Java virtual machine is an interpreter that executes such byte codes. Some of the Java virtual machines translate the byte codes into an executable form which can be interpreted by the CPU 514 and pass the resultant to the CPU 514, which executes it. The JavaVM 1203 gets activated, with a Java program to be executed being specified by the kernel 1201a. In the present embodiment, the kernel 1201a specifies the service manager 1204 as a Java program to be executed. A detailed commentary on the Java language is given in many books that include "Java Language Specification" (ISBN 0-201-63451-1). Therefore, a detailed description about it is omitted here. Also, a detailed commentary on the operation of the Java VM itself is given in many books that include "Java Virtual Machine Specification" (ISBN 0-201-63451-X). Therefore, a detailed description about it is omitted here.

The service manager 1204, which is a Java program written in the Java language, is executed by the JavaVM 1203 sequentially. It is possible for the service manager 1204 to call and to be called by another sub program not written in the Java language through the JNI (Java Native Interface). A commentary on the JNI is given in many books that include "Java Native Interface". Therefore, a detailed description about it is omitted here.

The service manager 1204 accepts the identifier of the channel from the reproduction unit 1102b through the JNI.

First, the service manager 1204 passes the identifier of the channel to a Tuner 1205c in the Java library 1205 so as to request for tuning. The Tuner 1205c refers to the channel information stored in the secondary storage unit 510 to obtain the tuning information. Assuming that the service manager 1204 passes the identifier "2" of the channel to the Tuner 1205c, the Tuner 1205c refers to the column 1412 shown in FIG. 15, and obtains the tuning information "156 MHz," corresponding to the channel. The Tuner 1205c passes the tuning information to the QAM demodulation unit 501 via the library 1201b of the OS 1201. The QAM demodulation unit 501 demodulates the signal sent from the head end 101 according to the tuning information given to the QAM demodulation unit 501, and passes the resultant signal to the POD 504.

Next, the service manager 1204 requests a CA 1205b inside the Java library 1205 to perform descrambling. The CA 1205d provides the POD 504 with information required for descrambling through the library 1201b in the OS 1201. On the basis of such provided information, the POD 504 descrambles the signal provided by the QAM demodulation unit 501, and passes the resultant signal to the TS decoder 505.

Next, the service manager 1204 provides a JMF 1205a inside the Java library 1205 with the identifier of the channel, so as to request for the reproduction of the video and audio.

First, the JMF 1205a obtains, from a PAT and a PMT, packet IDs used to specify the video and audio to be reproduced. PAT and PMT are tables defined by the MPEG-2 standard that show the program line-up included in an MPEG2 transport stream. PAT and PMT are carried in the payloads in packets included in an MPEG2 transport stream, together with audio and video. Refer to the specification for a detailed description of PAT and PMT. Here, only an overview of PAT and PMT is given. PAT, which is an abbreviation of Program Association Table, is carried in packets with the packet ID "0". In order to obtain the PAT, the JMF 1205a indicates, to the TS decoder 505, the packet ID "0" and the CPU 514 through the library 1201b of the OS 1201. Then, the TS decoder 505 performs filtering based on the packet ID "0", and passes the resultant to the CPU 514. Accordingly, the JMF 1205a can collect the PAT packets. FIG. 17 illustrates a table that schematically shows an example of the collected PAT information. A column 1601 describes program numbers. A column 1602 describes packet IDs. The packet IDs shown in the column 1602 are used to obtain the PAT. Each of lines 1611~1613 is a pair of the program number of a channel and a packet ID corresponding to it. Here, three channels are defined. The line 1611 defines a pair of the program number "101" and the packet ID "501". Assuming that the channel identifier provided to the JMF 1205a is "2", the JMF 1205a refers to the column 1412 in FIG. 15, so as to obtain the program number "102" corresponding to such channel identifier, and then refers to the column 1612 in the PAT shown in FIG. 17, so as to obtain the packet ID "502" corresponding to the program number "102". PMT, which is an abbreviation of Program Map Table, is carried in packets with the packet IDs specified in the PAT. In order to obtain the PMT, the JMF 1205a indicates, to the TS decoder 505, a packet ID and the CPU 514 through the library 1201b of the OS 1201. Here, a packet ID to be specified is "502". Then, the TS decoder 505 performs filtering based on the packet ID "502", and passes the resultant to the CPU 514. Accordingly, the JMF 1205a can collect the PMT packets. FIG. 18 illustrates a table that schematically shows an example of the collected PMT information. A column 1701 describes stream types. A column 1702 describes packet IDs. Information specified in the respective stream types is carried in the payloads of packets with the packet IDs specified in the column 1702. A column 1703 describes additional information. Each of lines 1711~1714 is a pair of a packet ID and the type of information being transmitted, which is known as an elementary stream. The line 1711, which is a pair of the stream type "audio" and the packet ID "5011", indicates that audio data is stored in the payload of the packet with the packet ID "5011". The JMF 1205*a* obtains, from the PMT, the packet IDs of the video and audio to be reproduced. Referring to FIG. 18, the JMF 1205*a* obtains the audio packet ID "5011" from the line 1711, and the video packet ID "5012" from the line 1712.

Then, the JMF 1205*a* provides the TS decoder 505 with pairs of the obtained audio packet ID and the audio decoder 506 as an output destination as well as the video packet ID and the video decoder 508 as an output destination, via the library 1201*b* of the OS 1201. The TS decoder 505 performs filtering based on such provided packet IDs and the output destinations. Here, the packet with the packet ID "5011" is passed to the audio decoder 506 and the packet with the packet ID "5012" is passed to the video decoder 508. The audio decoder 506 performs digital-to-analog conversion on the provided packet, so as to reproduce the audio via the speaker 507. The video decoder 508 performs digital-to-analog conversion on the provided packet, so as to display the video on the display 509.

Finally, the service manager 1204 provides the channel identifier to an AM 1205*b* in the Java library 1205, so as to request for data broadcast reproduction. Here, data broadcast reproduction means to extract a Java program included in the MPEG2 transport stream and cause the JavaVM1203 to execute it. As a technique for embedding a Java program into an MPEG2 transport stream, a method known as DSMCC is used, which is described in the MPEG specification ISO/IEC13818-6. A detailed explanation of DSMCC is omitted here. DSMCC specification defines a method of encoding a file system comprised of directories and files used by a computer, in packets within an MPEG2 transport stream. Information about the Java program to be executed is carried in packets in the MPEG2 transport stream in the form of AIT. AIT is an abbreviation of Application Information Table whose definition is given in the tenth chapter of the DVB-MHP standard (formally known as ETSI TS 101 812 DVB-MHP specification V1.0.2).

First, in order to obtain the AIT, the AM 1205*b* obtains the PAT and PMT as in the case of the JMF 1205*a*, so as to obtain the packet ID of the packet that stores the AIT. Assuming that "2" is the provided channel identifier and that the PAT shown in FIG. 17 and the PMT shown in FIG. 18 are being transmitted, the AM 1205*b* obtains the PMT shown in FIG. 18 according to the same procedure followed by the JMF 1205*a*. Subsequently, the AM 1205*b* extracts, from the PMT, the packet ID of the elementary stream whose stream type is "Data" and which has "AIT" as additional information. As shown in FIG. 18, the elementary stream in the line 1713 corresponds to such elementary stream, and therefore the AM 1205*b* obtains the packet ID "5013" from it.

Figures 19, 20:
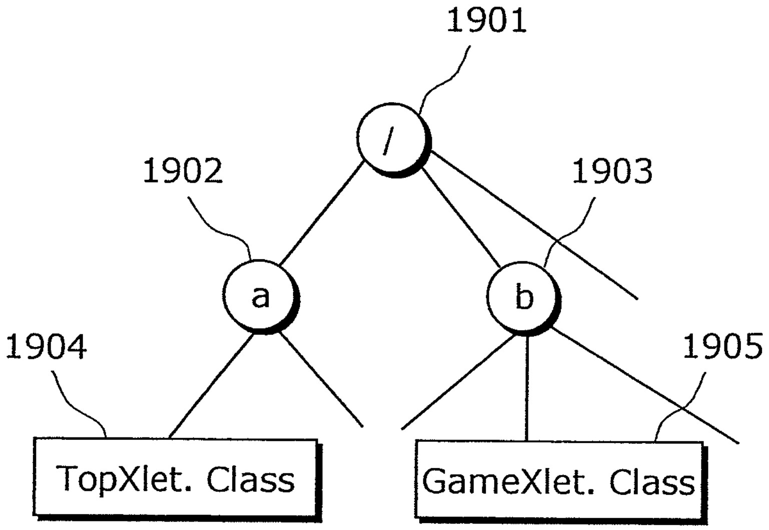
FIG. 19 is a schematic diagram showing the contents of an AIT specified in the DVB-MHP standard according to the present invention.
FIG. 20 is a schematic diagram showing a file system to be transmitted in the DSMCC format according to the present invention.

The AM 1205*b* provides the TS decoder 505 with the packet ID of the AIT and the CPU 514 as an output destination through the library 1201*b* of the OS 1201. Then, the TS decoder 505 performs filtering based on such provided packet ID, and passes the resultant to the CPU 514. Accordingly, the AM 1205*b* can collect the packets of AIT. FIG. 19 is a table that schematically shows an example of the collected AIT information. A column 1801 describes identifiers of Java programs. A column 1802 describes control information for controlling the Java programs. The control information includes "autostart", "present", and "kill". "autostart" means that the terminal apparatus 500 automatically executes the program promptly. "present" means that the program is not executed automatically. "kill" means that the program is to be terminated. A column 1803 describes DSMCC identifiers used to extract packet IDs that include Java programs in the DSMCC format. A column 1804 describes program names of the Java programs. Each of lines 1811 and 1812 is a set of information about a Java program. The Java program defined in the line 1811 is a set of an identifier "301", control information "autostart", a DSMCC identifier "1", and a program name "a/TopXlet". The Java program defined in the line 1812 is a set of an identifier "302", control information "present", a DSMCC identifier "1", and a program name "b/GameXlet". Here, these two Java programs have the same DSMCC identifier. This indicates that two Java programs are included in the file system which has been encoded according to the same DSMCC method. Here, only four pieces of information are specified for the respective Java programs, but more pieces of information are specified in actuality. Refer to the DVB-MHP specification for detail.

The AM 1205*b* finds the "autostart" Java program from the AIT, and extracts the corresponding DSMCC identifier and Java program name. Referring to FIG. 19, the AM 1205*b* extracts the Java program in the line 1811, and obtains the DSMCC identifier "1" and the Java program name "a/TopXlet".

Next, the AM 1205*b* obtains, from the PMT, the packet ID of packets that store Java programs in the DSMCC format, using the DSMCC identifier obtained from the AIT. More specifically, the AM 1205*b* obtains, from the PMT, the packet ID included in the elementary stream whose stream type is "Data" and whose DSMCC identifier in the additional information matches.

Here, assuming that such DSMCC identifier is "1" and the PMT is the one shown in FIG. 18, the elementary stream in the line 1714 satisfies the above condition. Therefore, the packet ID "5014" is to be extracted.

The AM 1205*b* indicates, to the TS decoder 505, the packet ID of packets in which data is embedded in the DSMCC format as well as the CPU 514 as an output destination through the library 1201*b* of the OS 1201. Here, the packet ID "5014" is provided. Then, the TS decoder 505 performs filtering based on the provided packet ID, and passes the resultant to the CPU 514. Accordingly, the AM 1205*b* can collect the required packets. The AM 1205*b* reconstructs the file system from the collected packets according to the DSMCC method, and stores the reconstructed file system into the primary storage unit 511. The process for extracting data such as the file system from packets in the MPEG2 transport and storing the extracted data into storage units such as the primary storage unit 511 is hereinafter called download.

FIG. 20 shows an example of the downloaded file system. In the diagram, circles represent directories and squares represent files, where 1901 is a root directory, 1902 is a directory "a", 1903 is a directory "b", 1904 is a file "TopXlet.class", and 1905 is a file "GameXlet.class".

Subsequently, the AM 1205*b* passes, to the JavaVM 1203, a Java program to be executed out of the file system downloaded into the primary storage unit 511. Here, assuming that the Java program name to be executed is "a/TopXlet", a file "a/TopXlet.class" resulted from appending ".class" to the above Java program name is a file to be executed. "/" is a delimiter between a directory and a file name, and as shown in FIG. 20, the file 1904 is a Java program to be executed. Next, the AM 1205*b* passes the file 1904 to the JavaVM 1203.

The JavaVM 1203 executes such received Java program.

Upon the receipt of the identifier of another channel, the service manager 1204 terminates the reproduction of the video and audio as well as the execution of the Java program which are being carried out through each library included in the Java library 1205, through each library included in the same Java library 1205, and then performs the reproduction of the video and audio as well as the execution of a Java program based on the newly received channel identifier.

The Java library 1205 is a collection of plural Java libraries stored in the ROM 512. In the present embodiment, the Java library 1205 includes the JMF 1205*a*, the AM 1205*b*, the Tuner 1205*c*, the CA 1205*d*, a POD lib 1205*e*, and the like.

Next, an explanation is given of the function for downloading, storing and executing a Java program, which is the main function in the present invention.

The service manager 1204 carries out a bilateral communication with the head end 101 through the POD lib 1205*e* included in the Java library 1205. This bilateral communication can be realized by the POD Lib 1205*e* through the use of the library 1201*b* of the OS 1201, as well as through the use of the QPSK demodulation unit 502 and the QPSK modulation unit 503 via the POD 504.

Through the above communication, the service manager 1204 receives, from the head end 101, information about Java programs which the terminal apparatus 500 should store in the secondary storage unit 510. Such information is called XAIT information. The XAIT information is transmitted between the head end 101 and the POD 504 in an arbitrary form. The present invention can be carried out regardless of transmission format, as long as information required as XAIT is included.

FIG. 21 illustrates a table that schematically shows an example of the XAIT information obtained from the head end 101. A column 2001 describes the identifiers of Java programs. A column 2002 describes control information for controlling the Java programs. The control information includes "autoselect" and "present". "autoselect" means that the program is executed automatically when the terminal apparatus 500 is powered on, and "present" means that the program is not to be executed automatically. A column 2003 describes DSMCC identifiers used to extract packet IDs that include Java programs in the DSMCC format. A column 2004 describes the program names of the Java programs. A column 2005 describes the priorities of the Java programs. Each of lines 2011 and 2012 is a set of information about the respective Java programs. The Java program defined in the line 2011 is a set of an identifier "701", control information "autoselect", a DSMCC identifier "1", and a program name "a/PPV1Xlet". Here, only five pieces of information are specified for the respective Java programs, but the present invention can be carried out even when more pieces of information are defined.

Figure 22:
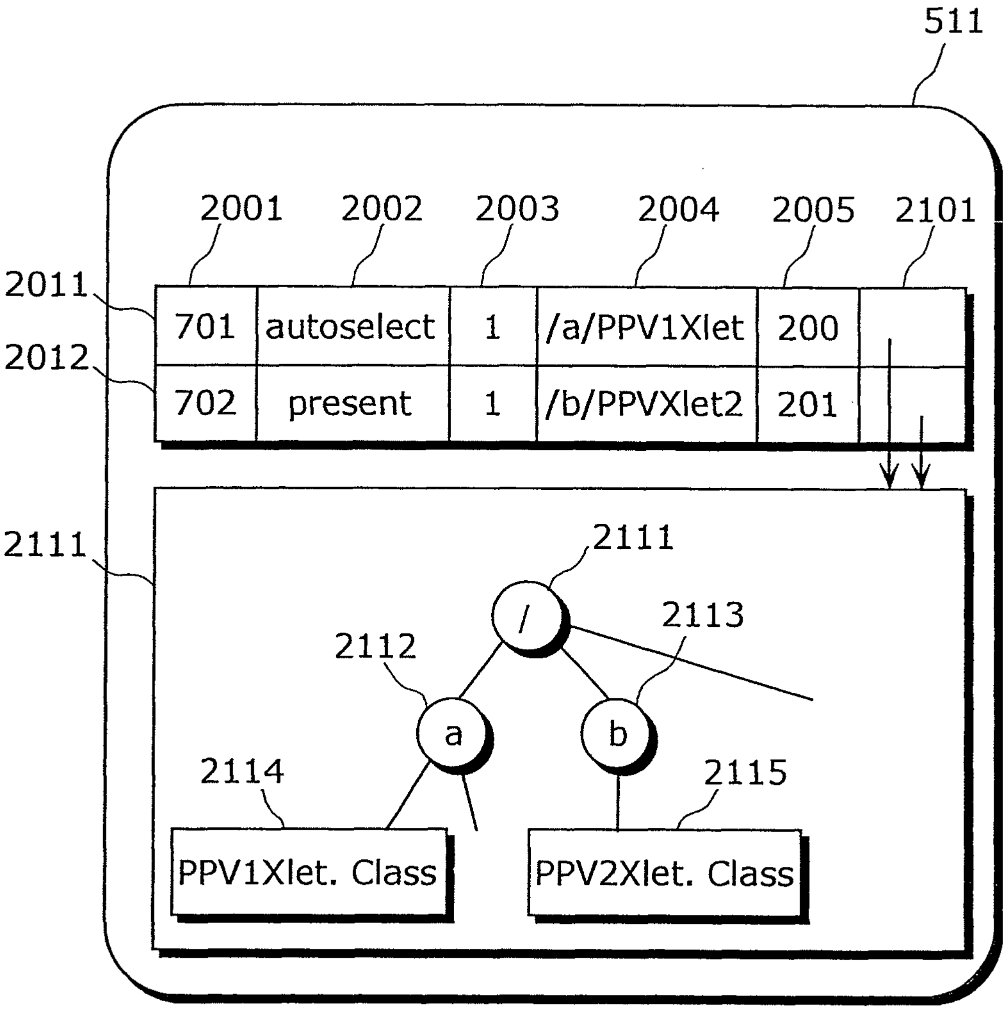
FIG. 22 shows an example of information stored in the secondary storage unit 510 according to the present invention.

On the receipt of the XAIT information, the service manager 1204 stores the file system from the MPEG2 transport stream into the primary storage unit 511, according to the same procedure as the one for downloading the Java program from the AIT information. Subsequently, the service manager 1204 copies such stored file system to the secondary storage unit 510. Note that it is also possible to download the file system not via the primary storage unit 511 but directly into the secondary storage unit 510. Next, the service manager 1204 stores, in the secondary storage unit 510, the result of associating the XAIT information with a storage position of the downloaded file system. FIG. 22 shows an example of the XAIT information and the downloaded file system stored in the secondary storage unit 510 in association with each other. Elements in FIG. 22 which are the same as those in FIG. 21 are the same as each other, and therefore an explanation for such elements is omitted. A column 2101 stores the storage position of the downloaded file system. In FIG. 22, such storage positions are indicated by arrows. 2110 is the downloaded file system, where a top directory 2111, a directory "a" 2112, a directory "b" 2113, a file "PPV1Xlet.class" 2114, and a file "PPV2Xlet.class" 2115 are included.

Here, the XAIT information is stored after the Java program is stored, but it is also possible for the XAIT information to be stored before the Java program.

When the terminal apparatus 500 is powered on, the OS 1201 indicates the service manager 1204 to the JavaVM 1203. Then, after activated by the JavaVM 1203, the service manager 1204 refers to the XAIT information which was stored in the secondary storage unit 510 first. Here, the service manager 1204 refers to the control information of each Java program, and passes the program "autoselect" to the JavaVM 1203, so as to activate such program. Referring to FIG. 22, the Java program "PPV1Xlet" defined in the line 2011 is activated here.

Here, assume that the Java program "PPV1Xlet" is a program for displaying PPV program information, such program corresponding to the PPV sub program 805 stored inside the POD 504. In the case where the terminal apparatus 500 does not have the Java program "PPV1Xlet", when the PPV sub program 805 sends, to the CPU 514 of the terminal apparatus 500, information wished to be displayed on the screen, a dialog display program included in the library 1201*b* in the OS 1201 shows a message shown in FIG. 23 on the display 509, urging the user to purchase the program. 2201 is a dialog box, which includes the following elements required for display: a message 2202; a personal identification number box 2203 for entering a four-digit personal identification number; an OK button 2204; and a cancel button 2205. However, the contents of the program is not shown on such display, which requires the user to check the program contents by referring to a program guide or other books, and therefore causes inconvenience to such user.

When stored in the terminal apparatus 500 and then activated, the Java program "PPV1Xlet" registers itself with the POD Lib 1205*e* in the Java library 1205 as a Java program which can be referred to from the POD 504. When registering itself, the Java program "PPV1Xlet" also registers its own Java program identifier, operation type, and priority at the same time. The POD Lib 1205*e* stores the registered details into the secondary storage unit 510. FIG. 24 shows an example of the registered Java program information stored in the secondary storage unit 510, such information being referable from the POD 504. In this example, such information is stored in tabular form, in which a column 2301 describes the identifiers of Java programs, a column 2302 describes operation types of the Java programs, a column 2303 describes the priorities of the Java programs, and a column 2304 describes the names of the Java programs. As shown in FIG. 25, the operation types of the respective Java programs are indicated by two values "1" and "2". The value "1" indicates that it is impossible for the registered Java program to be executed concurrently with another registered Java program or a program included in the library 1201*b* of the OS 1201. Meanwhile, the value "2" indicates that it is possible for the registered Java program to be executed concurrently with another registered Java program and a program included in the library 1201*b* of the OS 1201. Referring to FIG. 24, lines 2311~2312 describe registered Java programs. The line 2311 is a set of the identifier "PPV", the operation type "2", the priority "200", and the name of the Java program "PPV1Xlet".

Figure 26:
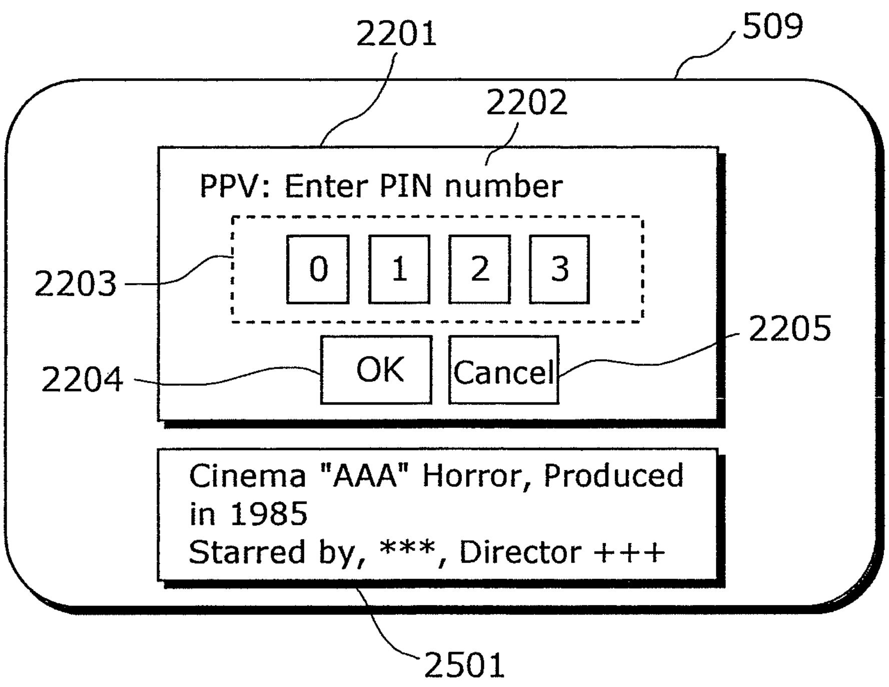
FIG. 26 shows an example of a display screen displayed by the display 509 according to the present invention.

The POD Lib 1205*e* notifies the POD 504 of the information about the registered Java programs. Accordingly, it becomes possible for the sub programs in the POD 504 and the registered Java programs to send and receive data between each other. For example, the PPV sub program 805 in the POD 504 sends the contents of a program in the scope of PPV purchase to the registered Java program in the line 2311 in FIG. 24. Accordingly, such Java program can display the information on the display 509 as illustrated in FIG. 26. Elements which are assigned the same numbers as assigned to the elements in FIG. 23 are the same as each other, and therefore an explanation for such elements is omitted. 2501 is the program information displayed by the registered Java program. Here, the dialog display program in the library 1201*b* of the OS 1201 and the above-registered Java program are executed concurrently. At this time, the POD 504 refers to the types of the registered Java programs so as to recognize the Java program to which data is to be sent.

Figure 27:
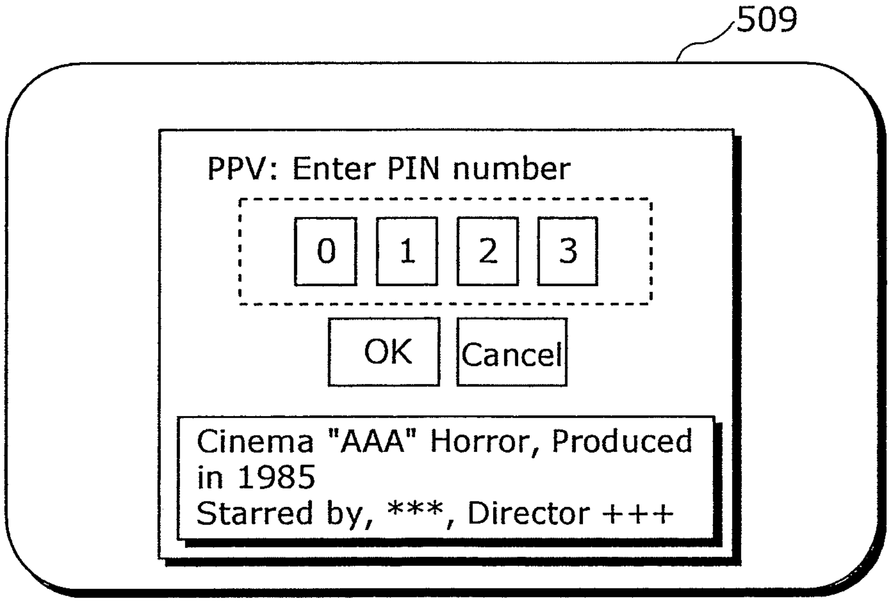
FIG. 27 shows an example of a display screen displayed by the display 509 according to the present invention.

Meanwhile, there is a possibility that 2201 and 2501 are displayed in an overlapped manner because of the reason that the dialog display program of the library 1201*b* in the OS 1201 and the registered Java program are developed separately. In order to circumvent this, it is possible to terminate the dialog display program of the library 1201*b* in the OS 1201. To be more specific, a Java program also has the function of entering a personal identification number which is supposed to be carried out by the dialog display program of the library 1201*b* in the OS 1201, and registers itself with its operation type as "1". FIG. 27 shows an example display screen displayed on the display 509 by such registered Java program in response to an instruction from the PPV sub program in the POD 504.

Figure 28:
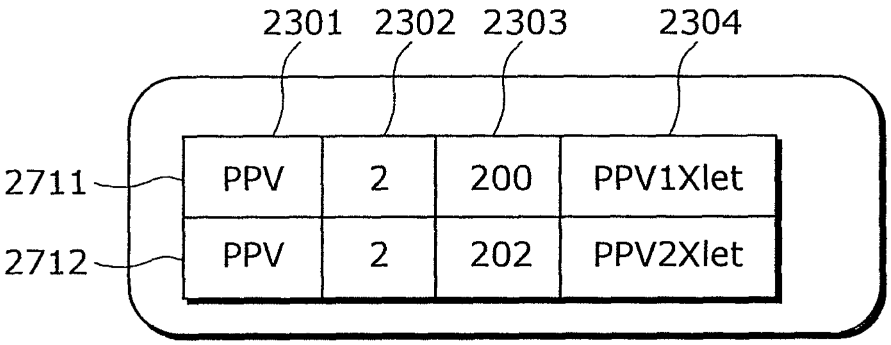
FIG. 28 shows an example of information stored in the secondary storage unit 510 according to the present invention.

Here, the secondary storage unit 510 stores the registered Java programs as shown in FIG. 28. In this example, these two Java programs have the same identifier "PPV" as well as the same operation type "1", meaning that these Java programs cannot coexist. In such a case, the POD Lib 1205*e* operates only the Java program with the higher priority. The other option is that the POD Lib 1205*e* operates both of the Java programs, but delivers a message from the POD 504 only to the Java program with the higher priority.

Figure 29:
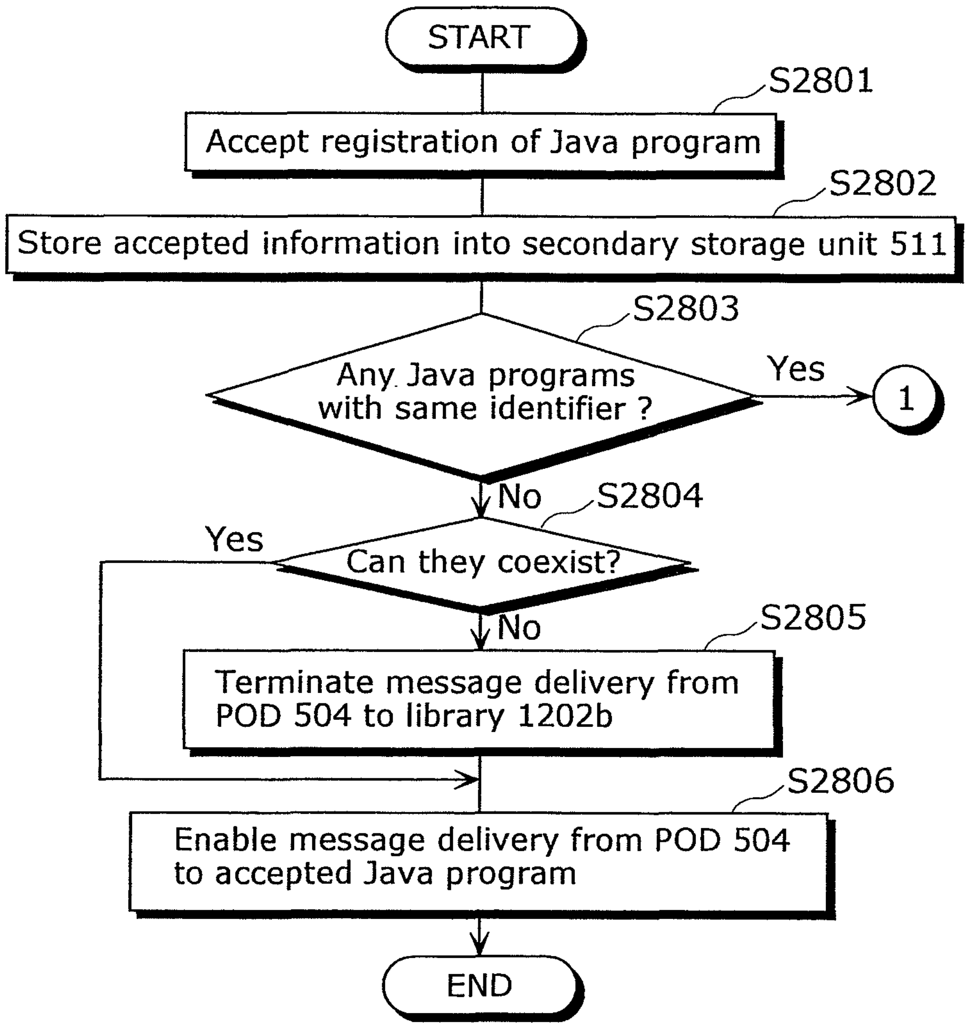
FIG. 29 is a flowchart showing an operation of a POD Lib **1205*e*** when accepting the registration of Java programs in the first embodiment.
Figure 30:
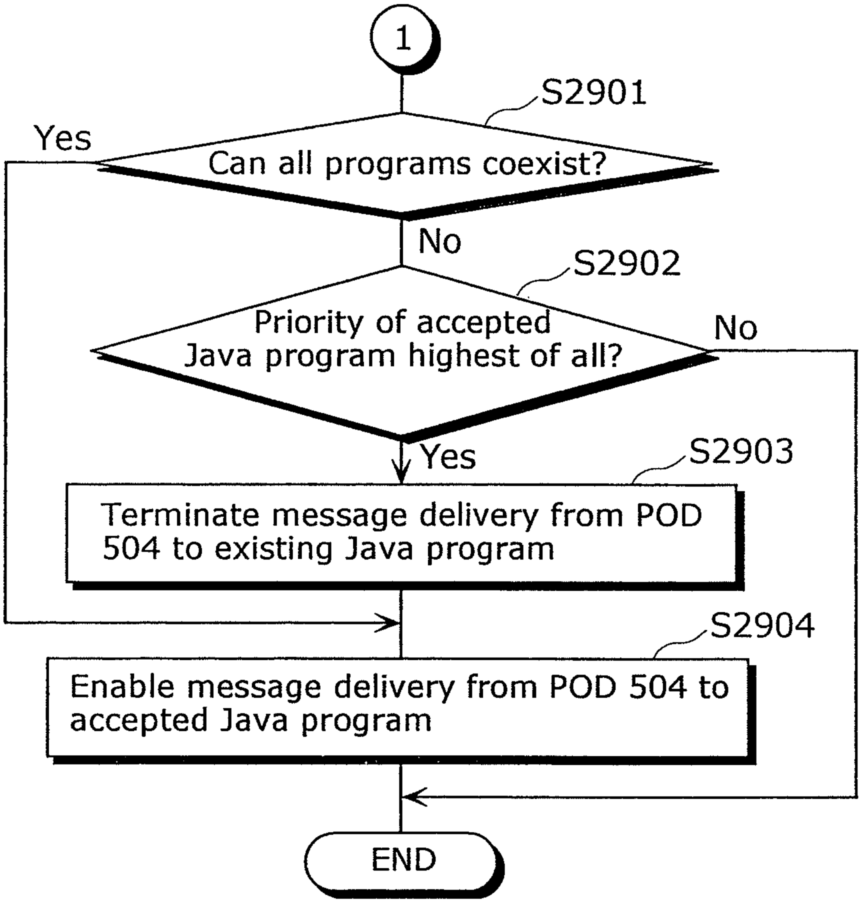
FIG. 30 is a flowchart showing an operation of the POD Lib **1205*e*** when accepting the registration of Java programs in the first embodiment.

FIG. 29 and FIG. 30 are flowcharts describing the operation of the POD Lib 1205*e* in the case where Java programs are registered in the POD Lib 1205*e*. The POD Lib 1205*e* accepts the registration of a Java program (Step S2801), and stores such accepted information in the secondary storage unit 510 (Step S2802). Then, the POD Lib 1205*e* compares the identifier of a Java program which is already registered in the secondary storage unit 510 with the identifier of the accepted Java program, in order to see whether there exists more than one Java program with the same identifier (Step S2803). When there exist Java programs with the same identifier, the POD Lib 1205*e* goes on to Step S2901 in FIG. 30. When there exist no Java programs with the same identifier, the POD Lib 1205*e* checks the operation type of the accepted Java program to see whether it is possible for such Java program to coexist and be executed concurrently with the already registered Java program (Step S2804). When it is impossible to do so, the POD Lib 1205*e* terminates message delivery from the POD 504 to the library 1201*b* of the OS 1201 (Step S2805). Subsequently, the POD Lib 1205*e* enables message delivery from the POD 504 to the accepted Java program (Step S2806), and completes the registration process. Meanwhile, when there exists more than one Java program with the same identifier in Step S2803, the POD Lib 1205*e* checks the operation types of all of such Java programs to see whether it is possible for them to coexist and be executed concurrently with one another (Step S2901). When there exists a Java program which cannot coexist and be executed concurrently, the POD Lib 1205*e* compares the priority of the accepted Java program with that of the existing Java program (Step S2902). When the priority of the accepted Java program is the highest of all, the POD Lib 1205*e* terminates the message delivery from the POD 504 to the existing Java program (Step S2903), and enables message delivery from the POD 504 to the accepted Java program (Step S2904). When the operation types of all the Java programs indicate that they can coexist and be executed concurrently, the POD Lib 1205*e* goes on to Step S2904. When the priority of the accepted Java program is not the highest of all in Step S2902, the POD Lib 1205*e* terminates the process without doing anything, since the existing Java program continues to receive messages in such case.

Figure 31:
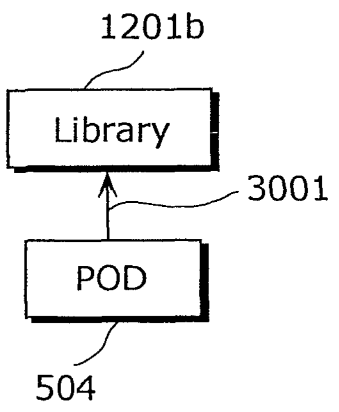
FIG. 31(1) is a schematic diagram showing message delivery from the POD 504 in the first embodiment.
Figure 31:
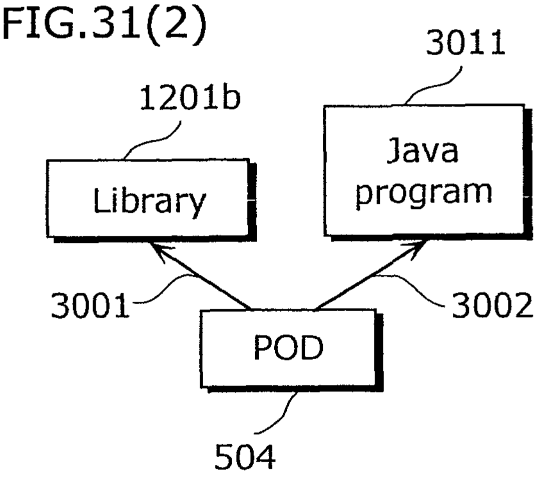
Figure 31:
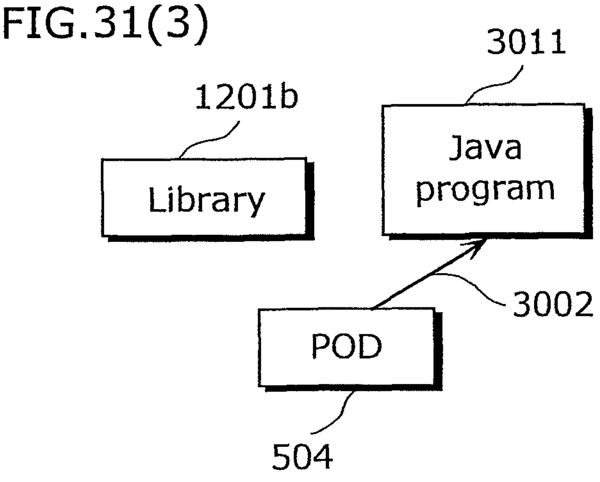
Figure 32:
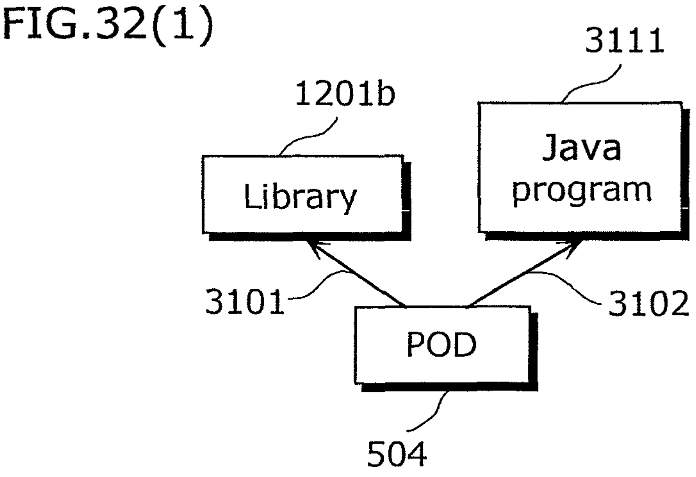
FIG. 32(1) is a schematic diagram showing message delivery from the POD 504 in the first embodiment.
Figure 32:
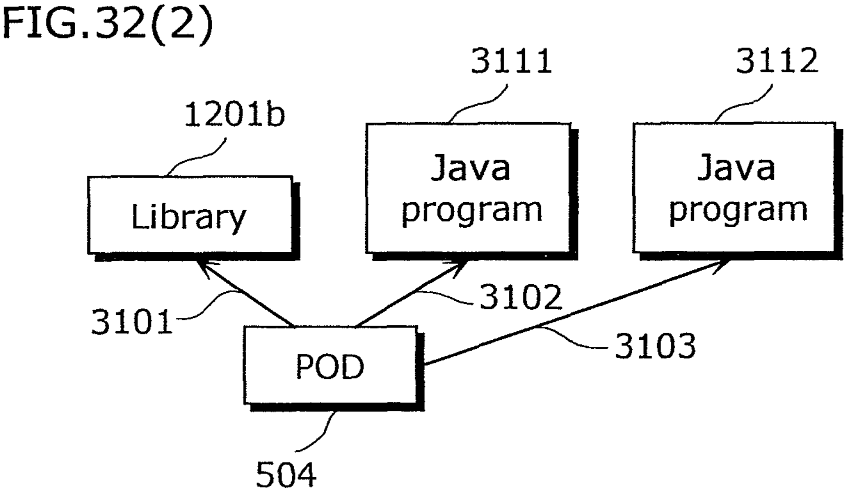
Figure 33:
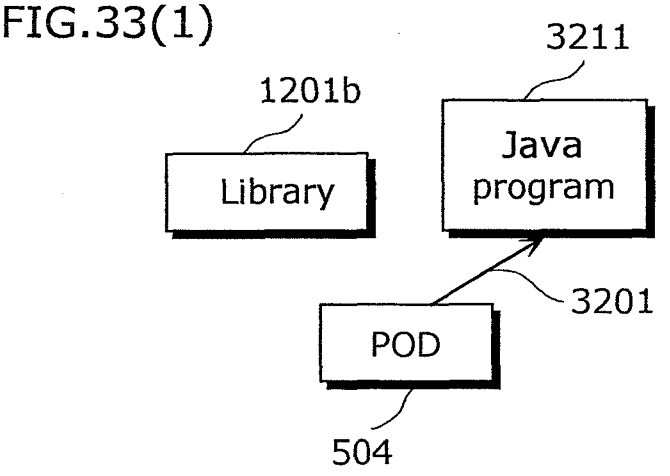
FIG. 33(1) is a schematic diagram showing message delivery from the POD 504 in the first embodiment.
Figure 33:
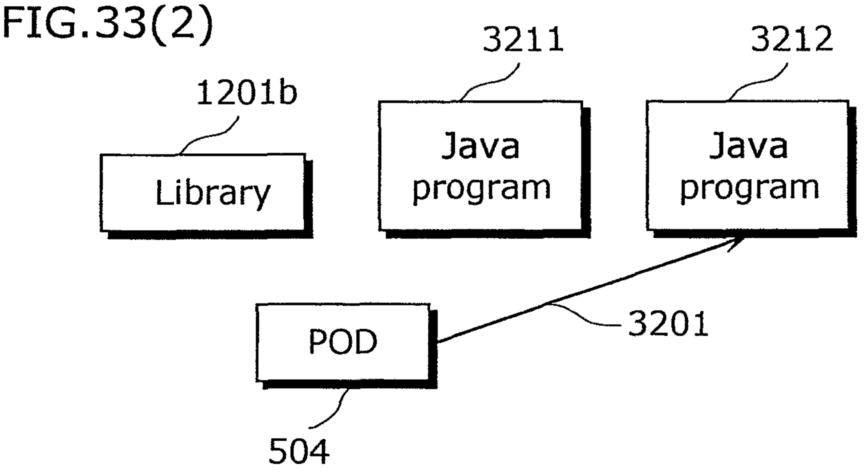
Figure 33:
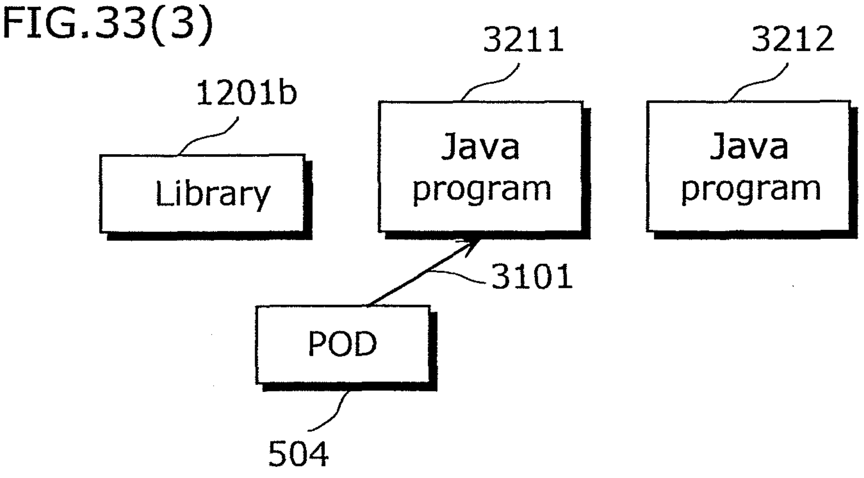

FIG. 31, FIG. 32, and FIG. 33 are diagrams that schematically show the changes in the delivery destinations of messages from the POD 504 on the basis of the flowcharts describing the above operation. FIG. 31(1) shows the state in which no Java program is registered, where all messages from the POD 504 are delivered to the library 1201*b* of the OS 1201. An arrow 3001 indicates message delivery. When a Java program is registered in the state shown in FIG. 31(1) and when the operation type of such registered Java program allows for coexistence, Steps S2801, S2802, S2803, S2804, and S2806 are executed with reference to the flowchart in FIG. 29, and the state shifts to the one shown in FIG. 31(2). Here, 3011 is the registered Java program, and an arrow 3002 is a newly set flow of a message from the POD 504 to the Java program 3011. In a more precise sense, there is involvement of the CPU 514 and the POD Lib 1205*e* between the POD 504 and the Java program. When the operation type of the registered Java program does not allow for coexistence, Steps S2801, S2802, S2803, S2804, S2805, and S2806 are executed with reference to the flowchart in FIG. 29, and the state shifts to the one shown in FIG. 31(3). The POD Lib 1205*e* terminates the flow of a message from the POD 504 to the library 1201*b* indicated by the arrow 3001, and makes a new setting for message delivery from the POD 504 to the Java program 3011.

FIG. 32(1) shows the state in which one Java program is registered and all messages from the POD 504 are delivered to the library 1201*b* of the OS 1201 and a registered Java program 3111. Arrows 3101 and 3102 indicate message delivery. When a Java program is registered in the state shown in FIG. 32(1) and when the operation type of such registered Java program allows for coexistence, Steps S2801, S2802, S2803, S2901, and S2904 are executed with reference to the flowcharts in FIG. 29 and FIG. 30, and the state shifts to the one shown in FIG. 32(2). Here, 3112 is the registered Java program, and an arrow 3103 is a newly set flow of a message delivered from the POD 504 to the Java program 3112.

FIG. 33(1) shows the state in which one Java program is registered and all messages from the POD 504 are delivered to a registered Java program 3211. This state is attributable to the operation type of such Java program 3211 which does not allow for coexistence. An arrow 3201 indicates message delivery. When a Java program is registered in the state shown in FIG. 32(1) and when the operation type of such registered Java program allows for coexistence, a comparison is made between the priority of an existing Java program 3211 and the priority of the registered Java program. When the priority of the registered Java program is higher, Steps S2801, S2802, S2803, S2901, S2902, S2903 and S2904 are executed with reference to the flowcharts in FIG. 29 and FIG. 30, and the state shifts to the one shown in FIG. 32(2). The POD Lib 1205*e* terminates the flow of a message from the POD 504 to the Java program 3211 indicated by the arrow 3201, and makes a new setting for message delivery from the POD 504 to the Java program 3212. Meanwhile, when the priority of the existing Java program 3211 is higher, Steps S2801, S2802, S2803, S2901, and S2902 are executed with reference to the flowcharts in FIG. 29 and FIG. 30, and the state shifts to the one shown in FIG. 32(3). In this case, there will be no change in message delivery.

Note that when the highest priority of the existing Java programs is equal to the priority of the newly accepted Java program in Step S2902, control may be shifted to Step S2903 so as to enable the accepted Java program to receive a message. This indicates that an arbitrary one Java program is to be selected for execution when plural Java programs have the same priority.

Figure 34:
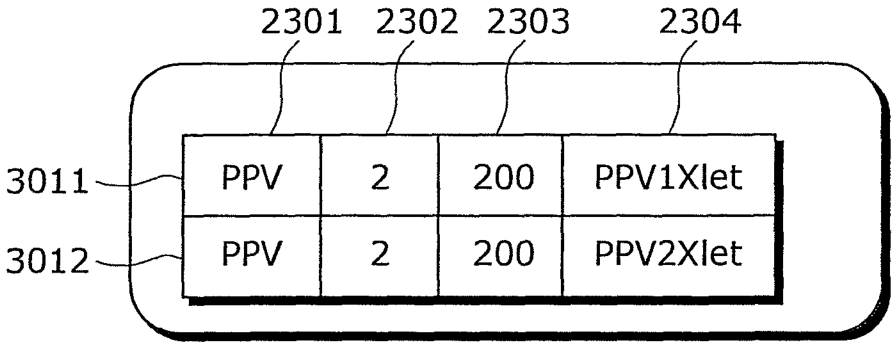
FIG. 34 shows an example of information stored in the secondary storage unit 510 according to the present invention.

In the other case, plural Java programs are to be executed, and the same messages will be sent to such plural Java programs. In this case, such Java programs are intentionally assigned the same priority and identifier and implemented in a manner in which they understand one another's operation so that no problem occurs even when they are executed concurrently. FIG. 34 shows an example case where plural Java programs have the same identifier and priority. Here, the POD 504 sends the program contents and charge information. It is possible that a Java program in a line 3311 displays the charge and accepts an input of a personal identification number, and that a Java program in a line 3312 displays only the program contents.

Figure 35:
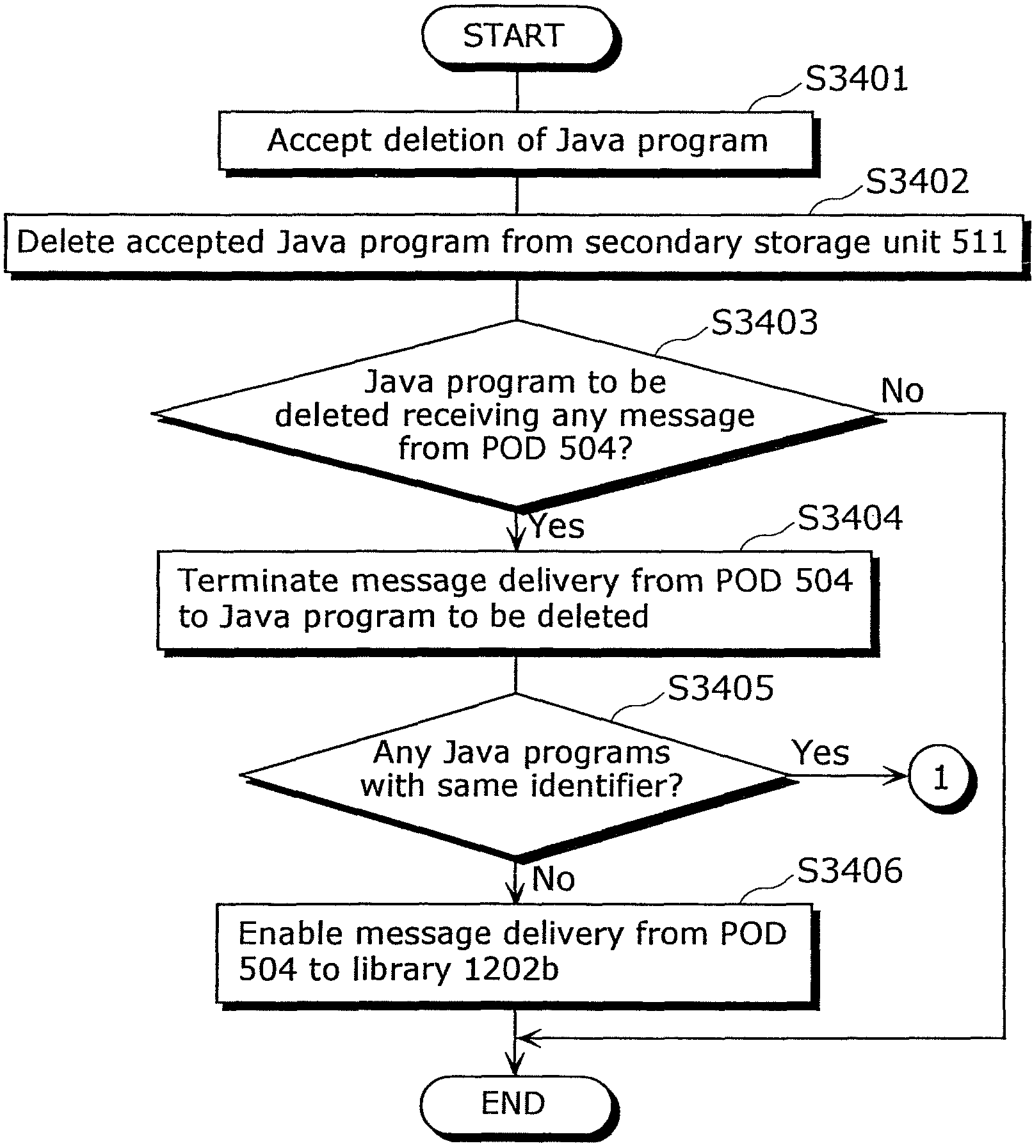
FIG. 35 is a flowchart showing an operation of the POD Lib 1205*e* when accepting the deletion of Java programs in the first embodiment.
Figure 36:
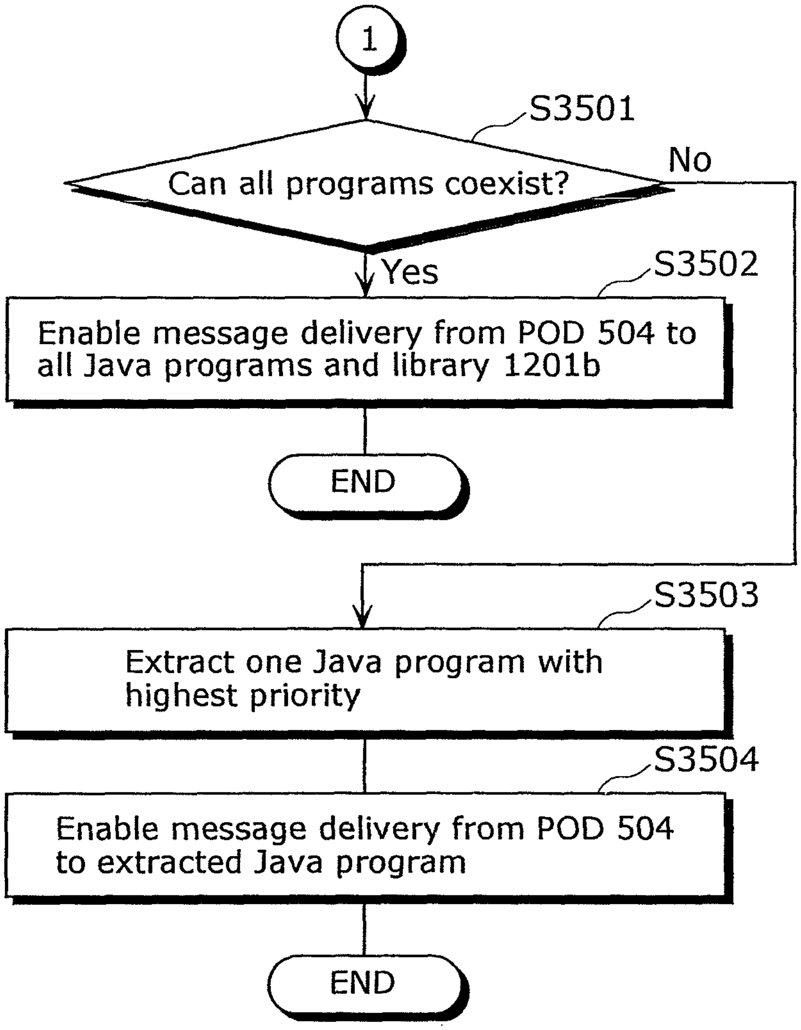
FIG. 36 is a flowchart showing an operation of the POD Lib 1205*e* when accepting the deletion of Java programs in the first embodiment.

The POD Lib 1205*e* accepts the registration as well as the deletion of Java programs. FIG. 35 and FIG. 36 are flowcharts describing the operation of the POD Lib 1205*e* in the case where the POD Lib 1205*e* deletes the registration of a Java program. The POD Lib 1205*e* accepts the deletion of a Java program (Step S3401), and deletes the accepted Java program from the secondary storage unit 510 (Step S3402). Then, the POD Lib 1205*e* checks whether the Java program to be deleted is currently receiving any message from the POD 504 or not (Step S3403). When such Java program is receiving a message, the POD Lib 1205*e* disables message delivery from the POD 504 to the accepted Java program (Step S3404). Then, the POD Lib 1205*e* checks whether the secondary storage unit 510 stores any Java program with the same identifier or not (Step S3405). When there is no Java program with the same identifier, the POD Lib 1205*e* enables message delivery from the POD 504 to the library 1201*b* of the OS 1201 (Step S3406). When the Java program to be deleted is not receiving any message from the POD 504 in Step 3403, the POD Lib 1205*e* terminates the process. Meanwhile, when there is a Java program with the same identifier as that of the Java program to be deleted in Step 3405, the POD Lib 1205*e* checks whether all the Java programs can coexist and be executed concurrently, with reference to FIG. 36 (Step S3501). And, the POD Lib 1205*e* enables message delivery from the POD 504 to all the Java programs with the same identifier that can coexist as well as to the library 1201*b* of the OS 1201 (Step S3502). When all the Java programs cannot coexist and be executed concurrently, the Java program with the highest priority is extracted (Step S3503). Then, the POD Lib 1205*e* enables message delivery from the POD 504 to such extracted Java program (Step S3504).

As described above, by executing instead a temporarily downloaded program without deleting an existing program, the present embodiment makes it possible to update a program as well as to easily restore the existing program to the state before it is updated. Furthermore, by downloading and storing a program in a manner that enables such program to be executed concurrently with an existing program, it becomes possible to add a function that the existing program does not include.

Note that, in the present embodiment, the PPV sub program 805 in the POD 504 and a Java program exchange messages and perform operations accordingly, but the present invention is also applicable to the case where not only PPV but also any other sub program in the POD 504 exchanges messages with any Java program on the terminal apparatus 500, so as to perform their operations. Also, Java programs may be made up of a mixture of a part written in Java and a part in binary format which can be directly executed by the CPU, or the whole part may be in binary format which can be directly executed by the CPU.

In the present embodiment, it is also possible to omit the ROM 512 by storing information stored in the ROM 512 into the secondary storage unit 510. Furthermore, it is also possible that the secondary storage unit 510 is made up of plural sub secondary storage units, and each sub secondary storage unit stores different information, so that information can be stored in segments. For example, one sub secondary storage unit may store only tuning information, another sub secondary storage unit may store the library 1201*b* of the OS 1201, and another different sub secondary storage unit may store a downloaded Java program.

(Second Embodiment)

In the first embodiment, when a Java program is registered, a communication to exchange messages between the POD 504 and the library 1201*b* of the OS 1201 as well as Java programs already registered in the secondary storage unit 510 is terminated all of a sudden. For example, when a Java program is registered while the user is carrying out the process of purchasing a PPV, it is possible that such purchasing process is interrupted and a personal identification number that the user is entering may become invalidated before completion.

Thus, in the present embodiment, a notification is made to the library 1201*b* of the OS 1201 and existing Java programs which are subject to the termination of a commutation to exchange messages before terminating such commutation, so as to obtain an approval from them. More specifically, a flowchart shown in FIG. 34 replaces the termination of message delivery to the library 1201*b* in Step S2805 in FIG. 29 and the termination of message delivery to the existing Java program in Step S2903 in FIG. 30, FIGS. 29 and 30 being flowcharts describing the operation in the first embodiment.

Figure 37:
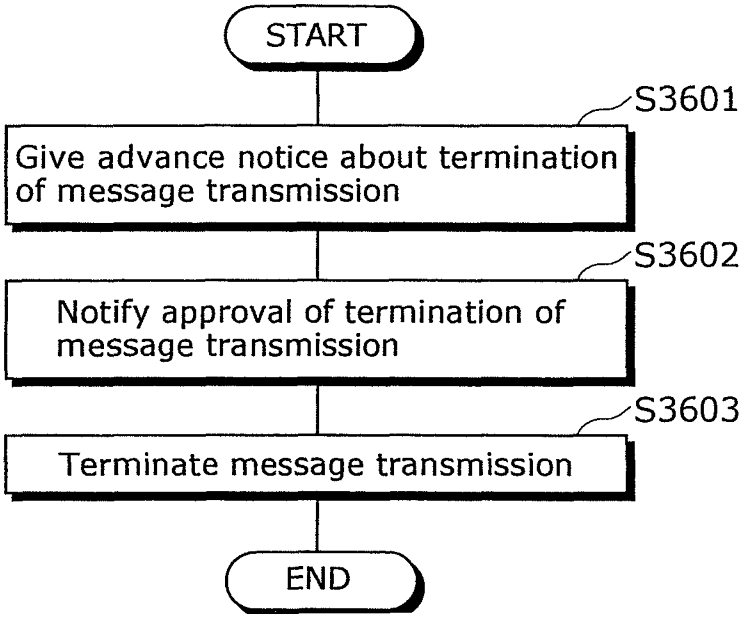
FIG. 37 is a flowchart showing a part of an operation of the POD Lib 1205*e* when accepting the registration of Java programs in the first embodiment.

Referring to FIG. 37, the POD Lib 1205*e* gives advance notice that message transmission will be terminated to targets of message transmission termination, i.e. Java programs and the library 1201*b* of the OS 1201 (Step S3601). The Java programs and the library 120 of the OS 1201 which have received the above notice then notify the POD Lib 1205*e* that they have approved the termination of message transmission, after performing necessary processing (Step S3602). Accordingly, the POD Lib 1205*e* terminates the transmission of messages (Step S3603).

Figure 38:
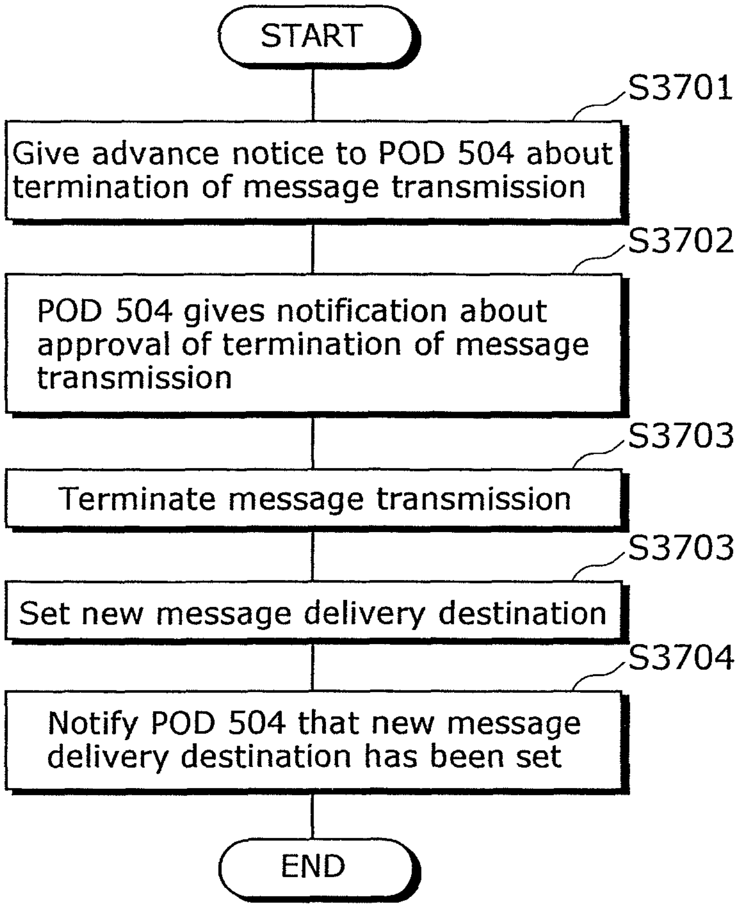
FIG. 38 is a flowchart showing a part of an operation of the POD Lib 1205*e* when accepting the registration of Java programs in the first embodiment.

Furthermore, it is also necessary to notify sub programs on the POD 504 that the destinations of message delivery have changed. FIG. 38 is a flowchart showing the operation of the POD Lib 1205*e* when notifying the POD 504 of the change in the message delivery destinations.

The POD Lib 1205*e* gives advance notice to the POD 504 that message transmission will be terminated (Step S3701). Upon the receipt of such notice, the POD 504 notifies the POD Lib 1205*e* that it has approved the termination of message transmission, after performing necessary processing (Step S3702). Accordingly, the POD Lib 1205*e* terminates the message transmission (Step S3703), and sets a new delivery destination (Step S3704). Finally, the POD Lib 1205*e* notifies the POD 504 that a delivery destination has been newly set (Step S3705).

Also, a Java program which has been set as a new delivery destination and the library 1201*b* of the OS 1201 may also be notified that a delivery destination has been newly set. This is because the Java program and the library 1201*b* of the OS 1201 not only receive messages from the POD 504, but also send messages to the POD 504. More specifically, they send to the POD 504 a personal identification number which the user enters for PPV. Therefore, when notified of the fact that message transmission has been enabled, they do not have to send messages needlessly.

(Third Embodiment)

In the first embodiment, registered Java programs are stored in the secondary storage unit 510, but it is also possible to carry out the present invention if registered Java programs are stored in the primary storage unit 511.

Figure 39:
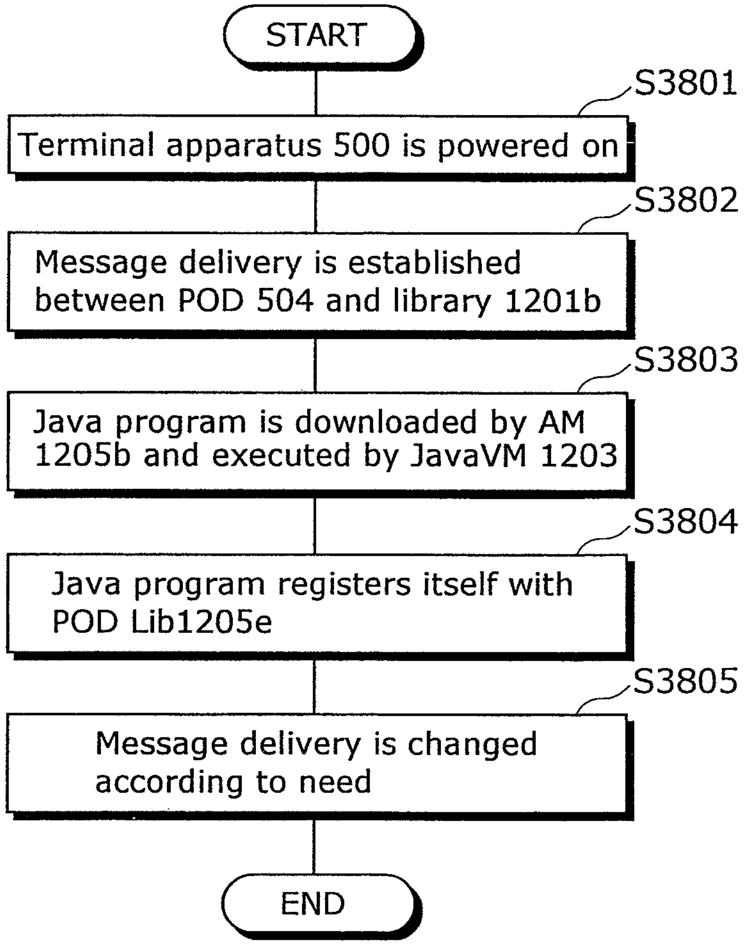
FIG. 39 is a flowchart showing an operation to be performed from when the terminal apparatus 500 is powered on to when a change is made in message delivery from the POD 504.

When registered Java programs are stored in the primary storage unit 511, all stored information vanishes at power-off time. However, when a Java program is downloaded for execution based on XAIT as described above, such executed Java program registers itself in the POD Lib 1205*e*, and therefore it is possible to restore such program. In this case, however, since the library 1201*b* of the OS 1201 continues to operate for a certain period of time after the power is turned on, a change will occur in message delivery. FIG. 39 is a flowchart showing the operation to be performed from when the terminal apparatus 500 is powered on to when a change is made in message delivery from the POD 504. When the terminal apparatus 500 is turned on (Step S3801), programs in the terminal apparatus 500 and the POD 504 are activated, and message delivery is established between the POD 504 and the library 1201*b* (Step S3802). The AM 1205*b* downloads a Java program according to XAIT information, and the JavaVM 1203 executes such Java program (Step S3803). When such Java program requires to exchange messages with the POD 504, it resisters itself with the POD Lib 1205*e* (Step S3804). Based on the flowcharts shown in FIG. 29 and FIG. 30, a change is made in message delivery where necessary (Step S3805).

Figure 40:
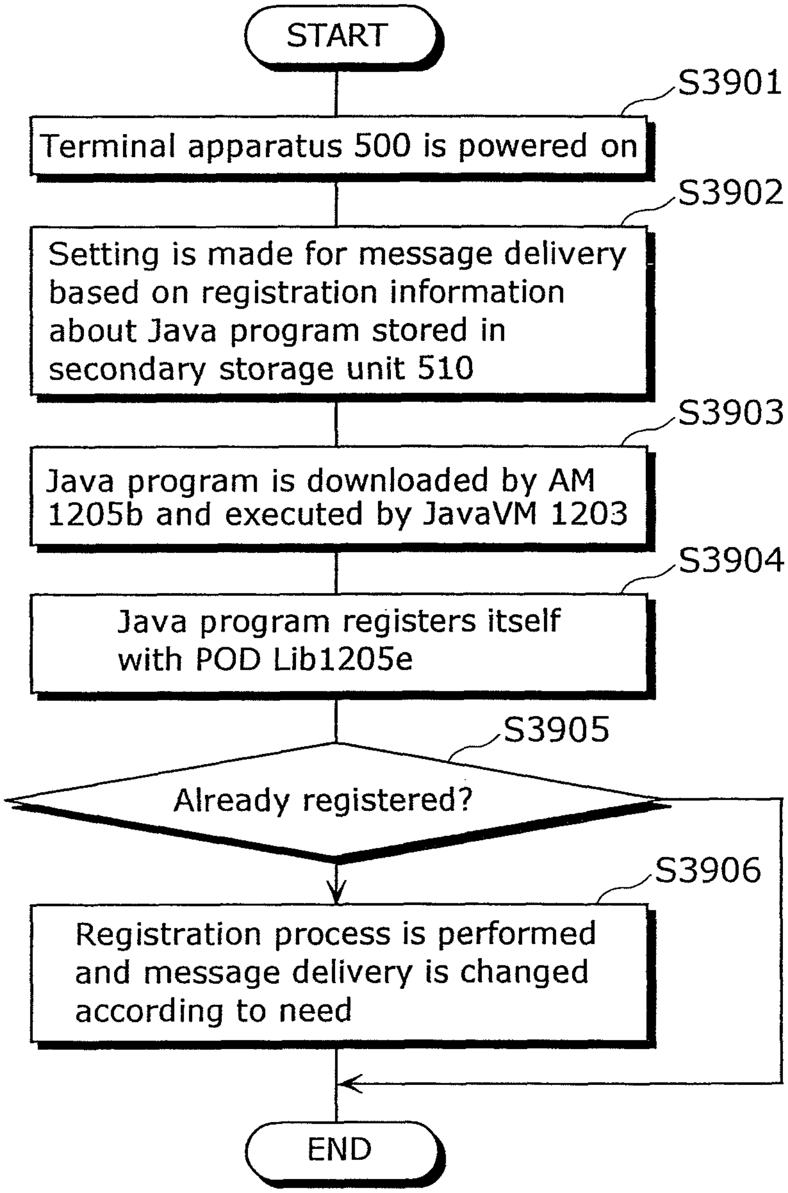
FIG. 40 is a flowchart showing an operation to be performed from when the terminal apparatus 500 is powered on to when a change is made in message delivery from the POD 504.

Meanwhile, when registered Java programs are stored in the secondary storage unit 510 as in the case of the first embodiment, messages are delivered from the POD 504 to the registered Java programs instead of the library 1201*b* of the OS 1201, after the power is turned on. However, when a Java program is downloaded and executed based on XAIT as described above, there will be double registration since such executed Java program registers itself with the POD Lib 1205*e*. In order to circumvent this, the POD Lib 1205*e* does not accept registrations from already registered Java programs. FIG. 40 is a flowchart showing the operation to be performed from when the terminal apparatus 500 is powered on to when a change is made in message delivery from the POD 504. When the terminal apparatus 500 is turned on (Step S3901), programs in the terminal apparatus 500 and the POD 504 are activated, and message delivery is established between the POD 504 and the Java programs or the library 1201*b* based on the registration information stored in the secondary storage unit (Step S3902). The AM 1205*b* downloads a Java program according to XAIT information, and the JavaVM 1203 executes such Java program (Step S3903). When such Java program requires to exchange messages with the POD 504, it resisters itself with the POD Lib 1205*e* (Step. S3904). The POD Lib 1205*e* refers to the secondary storage unit 510 to check whether such Java program is already registered or not (Step S3905). When such Java program is not registered yet, the registration process is then performed, and a change will be made in message delivery where necessary, based on the flowcharts shown in FIG. 29 and FIG. 30 (Step S3906).

Note that the present invention is applicable to the following through the first, second, and third embodiments.

The present invention is applicable to any information apparatuses such as personal computers and mobile phones.

Furthermore, the POD 504 is detachable in the above embodiments, but it is also possible to carry out the present invention if the POD 504 is embedded into the terminal apparatus 500. When the POD 504 is embedded, the CPU 706 of the POD 504 may be removed and the CPU 514 performs the operation of the CPU 706.

Moreover, it is also possible to carry out the present invention if not only downloaded Java programs but also pre-stored Java programs are to be registered in the POD Lib 1205*e*. Furthermore, it is also possible to provide a slot unit for inserting/ejecting a detachable storage medium such as an SD memory card, so as to load Java programs. Also, a network unit to get connected to a network may be provided, so as to load Java programs from the Internet.

Figure 41:
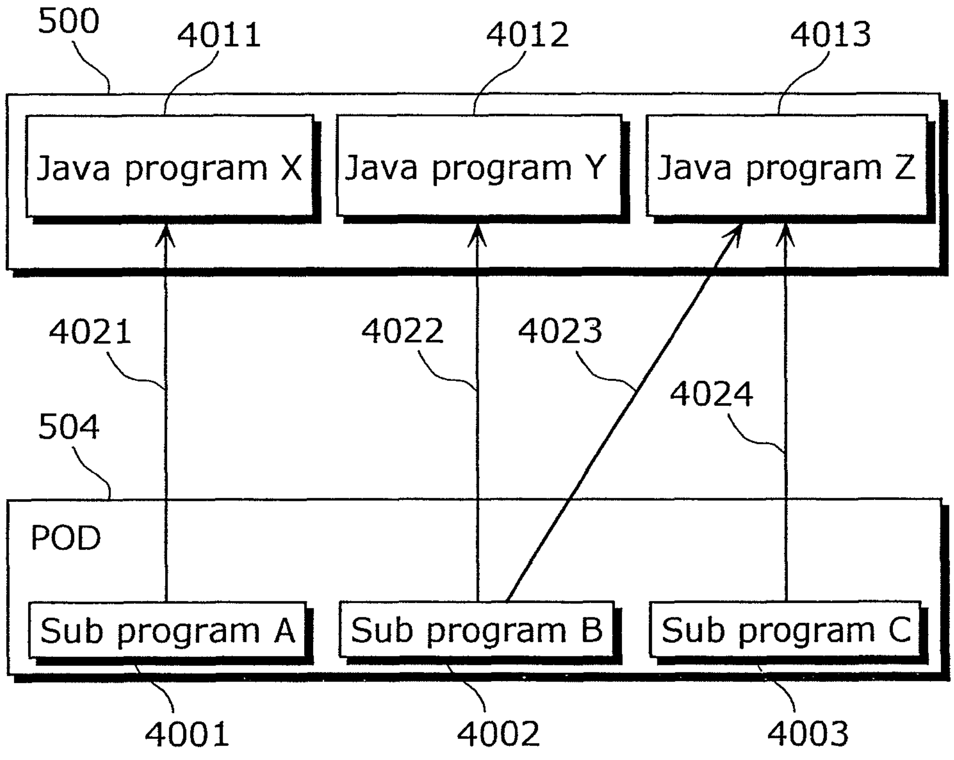
FIG. 41 is a diagram showing example paths for message delivery between Java programs on the terminal apparatus 500 and sub programs on the POD 504.

In the first to third embodiments, only one sub program on the POD 504 delivers messages to a Java program, but the present invention is applicable if two or more sub programs and Java programs deliver messages on an individual basis. FIG. 41 shows an example case where messages are delivered between plural sub programs on the POD 504 and plural Java programs. A sub program A4001, a sub program B4002, and a sub program C4003 are running on the POD 504, and a Java program X4011, a Java program Y4012, and a Java program Z4013 are running on the terminal apparatus 500. Arrows 4021, 4022, 4023 and 4024 indicate paths for message delivery which are set. The path 4021 is set for message delivery from the sub program A4001 to the Java program X4011, where the sub program and the Java program are in a one-to-one relationship. Meanwhile, the sub program B4002 has paths to two Java programs for message delivery, the Java program Y4012 and the Java program Z4013. In contrast, the Java program Z4013 receives messages from two sub programs, the sub program B4002 and the sub program C4003.

Note that this diagram illustrates the case where the messages are delivered from the sub programs to the Java programs, but the present invention is applicable if messages are delivered from the Java programs to the sub programs. Moreover, it is also possible that messages are exchanged bilaterally.

Here, message path IDs may be assigned to the above paths for message delivery so that sub programs and Java programs can identify where to send messages by the use of such message path IDs. Moreover, it is also possible to use these message path IDs at the time of registering Java programs, instead of the identifiers of the Java programs to be registered at the same time. In this case, it is possible to specify a Java program to deliver a message from among competing paths between Java programs and sub programs on the POD 504, based on their operation types. Alternatively, it is also possible to define sub program identifiers for identifying sub programs on the POD 504, and use such sub program identifiers at the time of registering Java programs, instead of the identifiers of the Java programs to be registered at the same time.

Moreover, a Java program to which a message is delivered is determined based on its operation type in the above explanation, but such determination may also be made based on the following predetermined rules, for example, without using operation types: that the lastly registered Java program shall be given a high priority; that the previously registered Java program shall be given a high priority.

In the first to third embodiments, the operation of the Java programs registered in the POD Lib 1205*e* means the operation to be performed in response to the delivery of a message. Stated another way, the Java programs start running in response to receipt of a message. At the same time, Java programs are capable of executing more than one processing in parallel. The present invention can be carried out without needing to impose any limits to processing of Java programs other than the processing that they start running in response to receipt of a message.

As described in the above embodiments, the POD Lib 1205*e* accepts deletion of a Java program to/from which messages are to be delivered (i.e. "unregistration" for disabling message delivery to/from the Java program), in addition to registration of such Java program.

Figure 42:
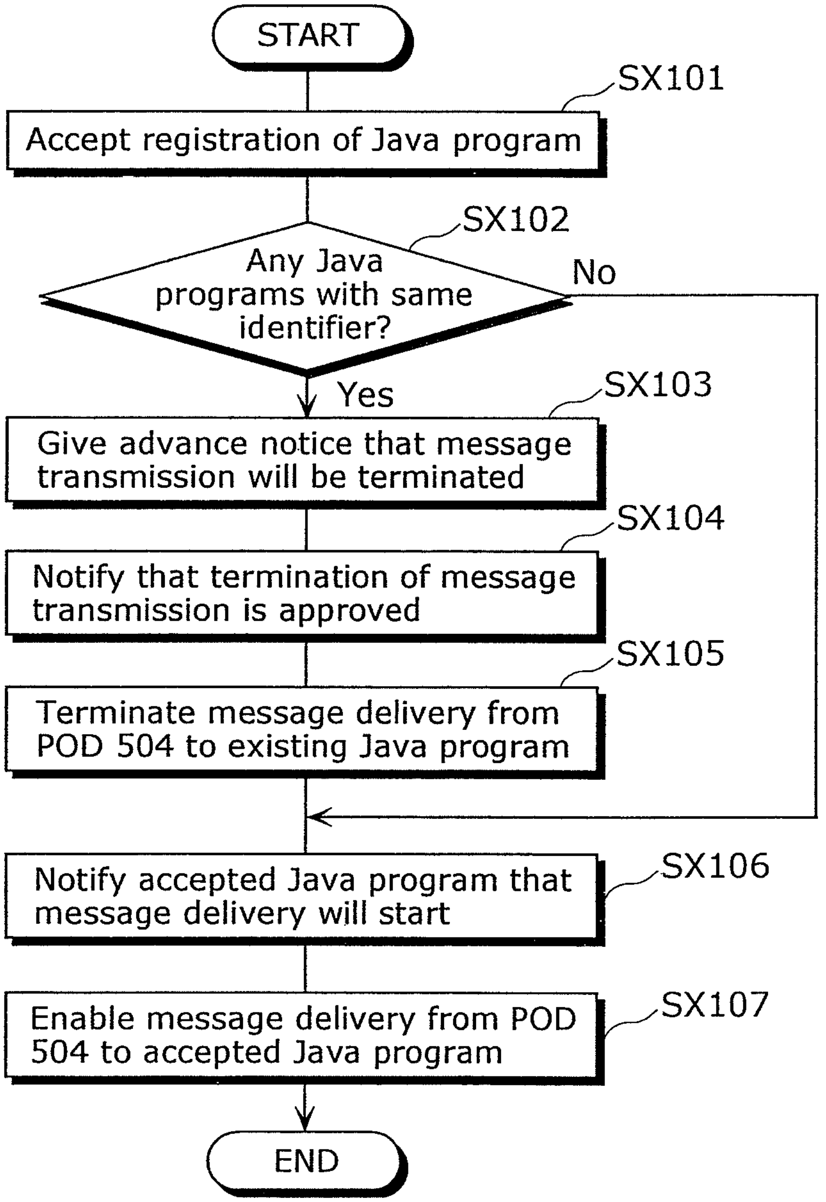
FIG. 42 is a flowchart that summarizes an operation of the POD Lib when a Java program is registered in the POD Lib.

FIG. 42 is a flowchart that summarizes the operation of the POD Lib 1205*e* when a Java program is registered in the POD Lib 1205*e*.

Upon accepting registration for message delivery (at least one or both of transmission and receiving of messages) to/from a Java program, the POD Lib 1205*e* stores necessary information (information shown in FIG. 28, for example) into the secondary storage unit 510 (Step SX101), and judges whether or not a Java program with the same identifier as the identifier of the registered Java program is stored in the secondary storage unit 510, by comparing the identifier of the Java program which has been registered in Step SX101 with the identifier of another Java program that is already registered in the secondary storage unit 510 (Step SX102).

As a result, when it is judged that there is a Java program with the same identifier in the secondary storage unit 510 (i.e. when the POD Lib 1205*e* accepted, before Step SX 101, registration for accepting message delivery to/from another Java program with the same identifier as the identifier of the Java program that is accepted in Step SX101) (Yes in Step SX102), the POD Lib 1205*e* gives advance notice that message transmission will be terminated to targets of message transmission termination (Step SX103). More specifically, said advance notice is given to another Java program that is registered in the secondary storage unit 510 (i.e. another program which has the same identifier as that of the Java program whose registration for message delivery has been accepted in Step SX101 and for which registration for accepting message delivery has been made) as well as to the library 1201*b* of the OS 1201. The Java program and the library 1201*b* of the OS 1201 which have received the above termination notice then notify the POD Lib 1205*e* that they have approved the termination of message transmission, after performing necessary processing (internal processing that should be terminated before message delivery to/from the POD 504 is terminated, i.e. before the registration for message delivery is unregistered) (Step SX104). Upon receipt of the above approval notification, the POD Lib 1205*e* deletes (unregisters) the registration for message delivery to/from the existing Java program (which is already registered in the secondary storage unit 510 and which is a target of the termination of message delivery to/from the POD 504) or to the library 1201*b* of the OS 1201, and terminates message delivery to the Java program (Step SX105). Then, by making registration for accepting message delivery from the POD 504 to the Java program which is registered in Step SX101 after notifying the Java program that has been registered in Step SX101 that message delivery will start (Step SX106), the POD Lib 1205*e* enables message delivery (Step SX107).

Meanwhile, when there is no Java program with the same identifier in the secondary storage unit 510 (No in Step SX102), the POD Lib 1205*e*, by making registration for accepting message delivery from the POD 504 to the Java program which is registered in Step SX101 after notifying the Java program that has been registered in Step SX101 that message delivery will start (Step SX106), the POD Lib 1205*e* enables message delivery (Step SX107).

Figure 43:
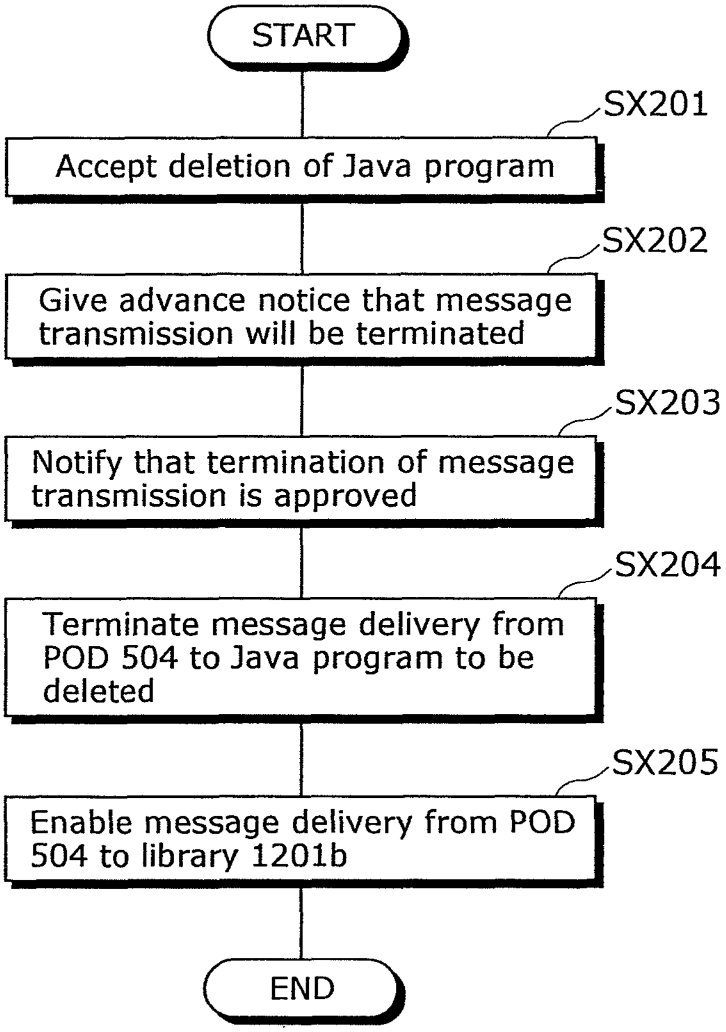
FIG. 43 is a flowchart that summarizes an operation of the POD Lib when the POD Lib deletes the registration of a Java program (i.e. unregisters the registration for message delivery to/from the Java program registered in the secondary storage unit).

FIG. 43 is a flowchart that summarizes the operation of the POD Lib 1205*e* when the POD Lib 1205*e* deletes the registration of a Java program (i.e. unregisters the registration for message delivery to/from the Java program registered in the secondary storage unit 510).

Upon accepting the deletion of the Java program (Step SX201), the POD Lib 1205*e* gives advance notice that message delivery will be terminated to the Java program to be deleted (Step SX202). The Java program that has received the above notice then notifies the POD Lib 1205*e* that it has approved the termination of message delivery, after performing necessary processing (internal processing that should be terminated before message delivery from the POD 504 is terminated, i.e. before the registration of message delivery is unregistered) (Step SX203). Upon receipt of the above approval notification, the POD Lib 1205*e*, by deleting (unregistering) the registration for message delivery to/from the Java program that is a target of the required deletion out of the Java programs registered in the secondary storage unit 510, terminates message delivery to such target Java program (Step SX204). Then, by making registration for accepting message delivery from the POD 504 to the library 1201*b* of the OS 1201, the POD Lib 1205*e* enables message delivery to the library 1201*b* of the OS 1201 (Step SX205).

Also, in Step SX205, when there is another registered Java program or a newly registered Java program in the secondary storage unit 510 and when it is wished (or it is possible) to carry out message delivery with one of these Java programs, message delivery to/from the target Java program may be enabled by making registration for accepting message delivery between the POD 504 and the target Java program. Furthermore, in message delivery to and from the POD 504, if a Java program and the library 1201*b* of the OS 1201 which are targets of message delivery can coexist (i.e. the Java program and the library 1201*b* of the OS 1201 do not conflict), message delivery to/from the target Java program and the library 1201*b* of the OS 1201 may be enabled after making registration for accepting message delivery to/from the library 1201*b* of the OS 1201.

As described above, by executing instead a temporarily downloaded program without deleting an existing program, the present embodiment makes it possible to update (replace) a program as well as to easily restore the existing program to the state before it is updated. Furthermore, by downloading and storing a program in a manner that enables such program to be executed concurrently with an existing program, it becomes possible to add a function that the existing program does not include.

What is claimed is:

1. A program replacing method for replacing a program in a broadcast receiving terminal apparatus, the program being registered so that a message transmission is enabled between the program and a detachable point of deployment (POD) provided to the broadcast receiving terminal apparatus, the method comprising:

registering a first program so that message transmission is enabled between the first program and the point of deployment, the first program having an identifier that identifies a program type of the first program;

judging whether a second program already exists in the broadcast receiving terminal apparatus and when the second program exists, notifying the second program that message transmission between the second program and the point of deployment is to be terminated, the second program having an identifier that identifies a program type of the second program and that is the same as the identifier of the program type of the first program;

receiving an approval for terminating the message transmission between the second program and the point of deployment, from the second program; and terminating the message transmission between the second program and the point of deployment, wherein the message transmission and reception between the second program and the point of deployment is terminated by unregistering the second program that has been registered so that message transmission and reception between the second program and the point of deployment is enabled.

2. A broadcast receiving terminal apparatus that replaces a program in said broadcast receiving terminal apparatus, the program being registered so that a message transmission is enabled between the program and a detachable point of deployment (POD) provided to said broadcast receiving terminal apparatus, said broadcast receiving terminal apparatus comprising:

a processor; and a memory that holds a library program executed by said processor, wherein the library program includes:

a register that registers a first program so that message transmission is enabled between the first program and the point of deployment, the first program having an identifier that identifies a program type of the first program;

a notifier that judges whether a second program already exists in the broadcast receiving terminal apparatus and when the second program exists, notifies the second program that message transmission between the second program and the point of deployment is to be terminated, the second program having an identifier that identifies a program type of the second program and that is the same as the identifier of the program type of the first program;

a receiver that receives an approval for terminating the message transmission between the second program and the point of deployment, from the second program; and a terminator that terminates the message transmission between the second program and the point of deployment, wherein the message transmission and reception between the second program and the point of deployment is terminated by unregistering the second program that has been registered so that message transmission and reception between the second program and the point of deployment is enabled.

* * * * *

UNITED STATES PATENT AND TRADEMARK OFFICE

CERTIFICATE OF CORRECTION

PATENT NO. : 8,850,511 B2
APPLICATION NO. : 13/870229
DATED : September 30, 2014
INVENTOR(S) : Takakazu Shiomi It is certified that error appears in the above-identified patent and that said Letters Patent is hereby corrected as shown below:

On the Title Page, item (71), Applicant, of the printed patent,
"Panasonic Corporation, Kadoma (JP)" should read --Panasonic Corporation, Osaka (JP)--.

Signed and Sealed this
Seventeenth Day of March, 2015

Michelle K. Lee

Michelle K. Lee
*Director of the United States Patent and Trademark Office*